US010246120B2

(12) United States Patent
Iwakawa

(10) Patent No.: US 10,246,120 B2
(45) Date of Patent: Apr. 2, 2019

(54) RACK AND PINION STEERING GEAR UNIT

(71) Applicant: NSK Ltd., Shinagawa-ku, Tokyo (JP)

(72) Inventor: Masato Iwakawa, Maebashi (JP)

(73) Assignee: NSK Ltd., Tokyo (JP)

( * ) Notice: Subject to any disclaimer, the term of this patent is extended or adjusted under 35 U.S.C. 154(b) by 26 days.

(21) Appl. No.: 15/492,908

(22) Filed: Apr. 20, 2017

(65) Prior Publication Data

US 2017/0217474 A1 Aug. 3, 2017

Related U.S. Application Data

(62) Division of application No. 14/348,292, filed as application No. PCT/JP2012/071435 on Aug. 24, 2012, now Pat. No. 9,656,685.

(30) Foreign Application Priority Data

Nov. 15, 2011 (JP) ................................. 2011-250111
Jul. 31, 2012 (JP) ................................. 2012-169538

(51) Int. Cl.
*B62D 3/12* (2006.01)
*F16B 21/18* (2006.01)
(Continued)

(52) U.S. Cl.
CPC .............. *B62D 3/12* (2013.01); *F16B 21/183* (2013.01); *F16C 19/06* (2013.01); *F16C 35/067* (2013.01);
(Continued)

(58) Field of Classification Search
CPC ......... B62D 3/12; B62D 3/126; F16H 57/021; F16H 57/028; F16H 19/04; F16H 19/06;
(Continued)

(56) References Cited

U.S. PATENT DOCUMENTS 2,898,135 A   8/1959   Wurzel
3,091,487 A   5/1963   Gallagher
(Continued)

FOREIGN PATENT DOCUMENTS

JP   54-106440   7/1979
JP   55-132449   9/1980
(Continued)

OTHER PUBLICATIONS

International Search Report dated Nov. 20, 2012 with English translation (six (6) pages).
(Continued)

*Primary Examiner* — Laura Freedman
(74) *Attorney, Agent, or Firm* — Crowell & Moring LLP

(57) ABSTRACT

Construction is achieved that is able to effectively prevent the displacement in the axial direction of a ball bearing 16 that supports the middle section of a pinion shaft 6 so as to be able to rotate freely, and that is compact and low cost. A fastening groove 28b is formed around the entire circumference of a portion near an opening of the inner circumferential surface of a sub housing section 12c of a casing 10c, and a radially outside portion of a C-shaped retaining ring 29b is fastened in this fastening groove 28b. As a result, a side surface in the axial direction of a radially inside portion of the retaining ring 29b is pressed against a side surface in the axial direction of an outer ring 18 of a ball bearing 16 that is fitted inside and supported by the inner circumferential surface of the sub housing section 12c. Moreover, a clip 35 having a radially outside arm section 43 and radially inside arm section 44 is mounted in the opening edge section of the sub housing section 12c, and a diameter reduction prevention section 36 that comprises the tip-end section of the radially inside arm section 44 is inserted into a non-continuous area 34 of the retaining ring 29b.

3 Claims, 31 Drawing Sheets

(51) Int. Cl.
F16C 19/06 (2006.01)
F16C 19/54 (2006.01)
F16C 35/07 (2006.01)
F16H 19/04 (2006.01)
F16J 15/06 (2006.01)
F16J 15/10 (2006.01)
F16C 35/067 (2006.01)
F16H 57/021 (2012.01)
F16H 57/028 (2012.01)
F16H 57/02 (2012.01)

(52) U.S. Cl.
CPC .............. *F16C 35/07* (2013.01); *F16H 19/04* (2013.01); *F16H 57/021* (2013.01); *F16H 57/028* (2013.01); *F16J 15/061* (2013.01); *F16J 15/106* (2013.01); *B62D 3/126* (2013.01); *F16C 19/54* (2013.01); *F16C 2226/74* (2013.01); *F16C 2326/24* (2013.01); *F16H 2057/02082* (2013.01); *Y10T 74/18096* (2015.01)

(58) Field of Classification Search
CPC .......... F16H 19/54; F16H 2057/02082; F16C 35/07; F16C 35/067; F16C 2326/24; F16C 2226/74; F16B 21/183; F16J 15/061; F16J 15/106; Y10T 74/18096
See application file for complete search history.

(56) References Cited

U.S. PATENT DOCUMENTS

| 4,299,302 | A | * | 11/1981 | Nishikawa | B62D 5/22 180/428 |
| 4,352,304 | A | * | 10/1982 | Warner | F16F 9/12 188/290 |
| 4,614,127 | A | | 9/1986 | Elser | |
| 4,724,714 | A | * | 2/1988 | Iwasaki | B62D 3/12 74/396 |
| 4,794,809 | A | * | 1/1989 | Kobayashi | B62D 3/123 74/422 |
| 4,815,329 | A | * | 3/1989 | Ansgar | B62D 3/12 74/422 |
| 4,827,788 | A | * | 5/1989 | Beer | B62D 3/12 280/93.515 |
| 6,471,410 | B1 | | 10/2002 | Jacobson | |
| 6,619,420 | B1 | | 9/2003 | Saarinen | |
| 7,357,216 | B2 | * | 4/2008 | Ishii | B62D 3/123 180/444 |
| 7,954,395 | B2 | * | 6/2011 | Ishii | B62D 1/19 74/388 PS |
| 8,813,594 | B2 | * | 8/2014 | Amada | B62D 3/123 74/388 PS |
| 9,211,905 | B2 | * | 12/2015 | Ueno | B62D 3/12 |
| 9,656,685 | B2 | * | 5/2017 | Iwakawa | F16C 35/07 |

FOREIGN PATENT DOCUMENTS

| JP | 56-119019 | | 9/1981 |
| JP | 58-8670 | | 1/1983 |
| JP | 58-8670 | U | 1/1983 |
| JP | 61-7609 | U | 1/1986 |
| JP | 61-88870 | U | 6/1986 |
| JP | 6-14523 | U | 2/1994 |
| JP | 2007112272 | A * | 5/2007 |
| JP | 2008114689 | A * | 5/2008 |
| JP | 2009-1240 | A | 1/2009 |
| JP | 2009-174558 | A | 8/2009 |
| JP | 2010-38254 | A | 2/2010 |
| JP | 2010-195278 | A | 9/2010 |
| JP | 2012-51406 | A | 3/2012 |

OTHER PUBLICATIONS

Japanese-language of Chinese Office Action in counterpart Application No. 201280039173.3 dated Jun. 1, 2015 with English translation (Fourteen (14) pages).

Extended European Search Report issued in counterpart European Application No. 12849100.8 dated Sep. 23, 2015 (Nine (9) pages).

* cited by examiner

RACK AND PINION STEERING GEAR UNIT

CROSS REFERENCE TO RELATED APPLICATIONS

This application is a divisional of U.S. patent application Ser. No. 14/348,292, now U.S. Pat. No. 9,656,685, the priority of which is claimed, which entered the U.S. national phase, on Aug. 4, 2014, as a 371 of International Application No. PCT/JP2012/071435, filed Aug. 24, 2012, the entire disclosure of which is expressly incorporated herein, which claims priority from Japanese Patent Application No. 2012-169538, filed Jul. 31, 2012, and Japanese Patent Application No. 2011-250111, filed Nov. 15, 2011, the disclosures of which are also expressly incorporated by reference herein.

TECHNICAL FIELD

The present invention relates to a rack and pinion steering gear unit of a steering apparatus for applying a steering angle to steered wheels of an automobile.

BACKGROUND ART

A steering apparatus that has a rack and pinion steering gear unit that uses a rack and pinion as a mechanism for converting rotating movement that is inputted from the steering wheel to linear movement for applying a steering angle is widely known. Moreover, a rack and pinion steering gear unit can be made compact and lightweight, and high rigidity and good steering feeling can be obtained, so is widely used.

FIG. 28 to FIG. 30 illustrates construction that was disclosed in JP2012-51406 (A) as an example of a steering apparatus in which this kind of rack and pinion steering gear unit is assembled. In this steering apparatus, movement of a steering shaft 2 that is rotated by operating a steering wheel 1 is transmitted to a pinion shaft 6, which is an input shaft of a steering unit 5, by way of a pair of universal joints 3 and an intermediate shaft 4.

The steering gear unit 5 is achieved by pinion teeth 7 that are provided on the tip end half of a pinion shaft 6 engaging with rack teeth 9 that are provided on the front surface of a rack shaft 8. Part of both the pinion shaft 6 and rack shaft 8 are housed inside a casing 10. The casing 10 has a cylindrical shaped main housing section 11 and a cylindrical shaped sub housing section 12. Of these, the main housing section 11 is open on both ends. The sub housing section 12 is provided on one side of the main housing section 11, and one end is open. The center axis of the main housing section 11 and the center axis of the sub housing section 12 are in a twisted positional relationship with each other. The rack shaft 8 is inserted through the main housing section 11 so as to be able to displace in the axial direction, and both end sections of the rack shaft 8 protrude from the main housing section 11. The base end sections of tie rods 14 are linked with both end sections of the rack shaft 8 by way of spherical joints 13. The tip end sections of these tie rods 14 are linked to the tip end sections of knuckle arms (not illustrated in the figure) by pivot shafts. By the pinion teeth 7 engaging with the rack teeth 9, the rack shaft 8 does not rotate around the center axis of the rack shaft 8 itself.

The pinion shaft 6 is such that the tip-end half where the pinion teeth 7 are formed is supported inside the sub housing section 12 so as to be able to rotate. In order for this, the tip-end section of the pinion shaft 6 is supported in the rear-end section of the sub housing section 12 by a radial needle bearing 15 so as to be able to freely rotate. Moreover, the middle section of the pinion shaft 6 is supported in the portion near the opening of the sub housing section 12 by a single-row ball bearing 16. The inner ring 17 of the ball bearing 16 is held between a radially inside stepped surface 19 that is formed around the middle section of the pinion shaft 6 and a conical shaped retaining ring 20 that engages with the middle section of the pinion shaft 6. The outer ring 18 of the ball bearing 16 is held between a radially outside stepped surface 21 that is formed around the middle section of the inner circumferential surface of the sub housing section 12 and a pressure screw cylinder 22 that is screwed into the inside of the end section on the opening side of the sub housing section 12. With this construction, the tip end half section of the pinion shaft 6 is supported inside the sub housing section 12 so as to be able to support both a radial load and a thrust load, and so as to be able to rotate while preventing displacement in the axial direction thereof.

Moreover, a cylinder section 23 is provided on the portion of the opposite side in the radial direction of the main housing section 11 from the sub housing section 12. A sliding block 25 that supports a pressure roller 24 so as to be able to rotate freely is housed inside this cylinder 23 so as to be able to move in the axial direction. A spring 27 is provided between a cover 26 that is fastened to the inside of the end section on the opening side of the cylinder 23 by a screw and the pressure block 25, and that spring 27 presses the pressure roller 24 toward the rack shaft 8. As a result, the rack shaft 8 is elastically pressed toward the pinion shaft 6, which eliminates looseness in the engagement section between the pinion teeth 7 and the rack teeth 9. Moreover, regardless of a force applied to the rack shaft 8 in the direction going away from the pinion shaft 6 that is caused by the transmission of power in the engagement section, it is possible to properly maintain a state of engagement in this engagement section.

When applying a steering angle to the left and right front wheels, the pinion shaft 6 is rotated by operating the steering wheel 1. In doing so, pinion teeth 7 and the rack teeth 9 engage, the rack shaft 8 displaces in the axial direction, and the pair of tie rods 14 that are linked to both end sections of the rack shaft 8 are pushed or pulled. As a result, the desired steering angle is applied to the left and right front wheels.

In the case of a steering gear unit 5 of a first example of conventional construction having this kind of construction, the pressure screw cylinder 22 is used to apply a preload to the ball bearing 16 that supports the pinion shaft 6. As a result, even though a force is applied to the pinion shaft 6 during steering, the engaged state of the engagement section between the pinion teeth 7 and rack teeth 9 is kept stable by preventing displacement of the pinion shaft 6 in the radial direction (left-right direction in FIG. 30) and in the thrust direction (up-down direction in FIG. 30). Moreover, together with suppressing the occurrence of striking noise between teeth in this engagement section, fluctuation of the steering force is prevented. By using the pressure screw cylinder 22 in this way, it becomes easy to apply a necessary preload to the ball bearing 16, and it is possible to effectively prevent the ball bearing 16 from displacing in the axial direction. However, when using the pressure screw cylinder 22, the installation space increases, so it becomes easy for the overall length of the sub housing section 12 to become long and for the steering gear unit 5 to become large. There is also a problem in that the work time for adjusting the preload becomes long.

JP2010-195278 (A) discloses construction where, instead of this kind of pressure screw cylinder, an incomplete circular shaped retaining ring is used to prevent a rolling bearing from falling out while applying a preload to the rolling bearing. FIG. 31 illustrates a steering gear unit 5a of a second example of conventional construction as disclosed in JP2010-195278 (A). In the case of this steering gear unit 5a, a fastening groove 28 is formed around the entire circumference of the portion near the opening of the inner-circumferential surface of a sub housing section 12a of a casing 10a. With the radially outside portion of an incomplete circular shaped retaining ring (tapered snap ring) 29 fastened in this fastening groove 28, one side surface in the axial direction of the radially inside portion of this retaining ring 29 is pressed against the side surface in the axial direction of an outer ring 18 of a ball bearing 16 that supports the middle section of a pinion shaft 6 so as to be able to rotate freely.

Moreover, the side surface 30 of the fastening groove 28 on the opening side (top side in FIG. 31) of the sub housing section 12a is inclined in a direction such that the width of the fastening groove 28 expands toward the inside in the radial direction. A tapered surface 31 is also formed in the portion of the retaining ring 29 that comes in contact with the side surface 30, and the cross-sectional shape of the radially outside portion of this retaining ring 29 is a wedge shape that is inclined in a direction such that the thickness dimension in the axial direction becomes smaller toward the outside in the radial direction. In the case of this kind of construction, the installation space of the retaining ring 29 is small, so it becomes easier to make the steering gear unit 5a more compact. Moreover, the work time for assembling the retaining ring 29 is short and does not require adjusting a preload.

However, when a force is applied to the pinion shaft 6 during steering, a thrust force acts on the retaining ring 29 in the upward direction in FIG. 31, which causes the diameter of the retaining ring 29 to contract being guided by the side surface 30, and it becomes easy for the retaining ring 29 to displace in the axial direction. As a result, it becomes easy for the ball bearing 16 to displace in the axial direction, and there is a possibility that occur such as shifting of the engagement section between the pinion teeth 7 and the rack teeth 9 from the proper position, the occurrence of noise, and fluctuation of the steering force.

In consideration of a situation such as described above, JP2010-38254 (A) discloses construction in which, even though a force is applied to the pinion shaft during steering, it is possible to prevent contraction of the retaining ring. FIG. 32 illustrates a steering gear unit 5b of a third example of conventional construction that is disclosed in JP2010-38254 (A). In the case of this steering gear unit 5b, plural protrusions 32 that protrude in the axial direction are formed on the outer peripheral edge of a tapered surface 31a of a retaining ring 29a. Moreover, an annular concave groove 33 is formed in a side surface 30a of a fastening groove 28a that is formed around the inner circumferential surface of a sub housing section 12b of a casing 10b. With the radially outside portion of the retaining ring 29a fastened in the fastening groove 28a, the protrusions 32 are located inside the annular concave groove 33.

Therefore, even when a thrust force acts on the retaining ring 29a in the upward direction in FIG. 32 when a force is applied to the pinion shaft 6 during steering, the protrusions 32 engage with the annular concave groove 33 and prevent contraction of the diameter of the retaining ring 29a. Therefore, it becomes difficult for the retaining ring 29a to displace in the axial direction, and it is possible to suppress the ball bearing 16 from displacing in the axial direction and to properly maintain the engagement position of the pinion teeth and rack teeth. However, the shapes of the fastening groove 28a and the retaining ring 29a are complicated, so there is a problem in that the processing becomes troublesome and the manufacturing cost increases.

RELATED LITERATURE

Patent Literature

[Patent Literature 1] JP2012-51406 (A)
[Patent Literature 2] JP2010-195278 (A)
[Patent Literature 3] JP2010-38254 (A)

SUMMARY OF INVENTION

Problem to be Solved by Invention

Taking in to consideration the situation described above, the object of the present invention is to achieve construction of a rack and pinion steering gear unit that is able to effectively prevent displacement in the axial direction of a rolling bearing for supporting the middle section of a pinion shaft so as to be able to rotate freely, and that has compact and low-cost construction.

Means for Solving Problems

The rack and pinion steering gear unit of the present invention comprises a casing, a rack shaft, a pinion shaft, a rolling bearing, a retaining ring and a diameter reduction prevention section. The casing has a cylindrical shaped main housing section that is open on both ends, and a cylindrical shaped sub housing section that is open on one end and that is provided in a twisted position with respect to the main housing section. The rack shaft has rack teeth on the front surface thereof, and is located on the inside of the main housing section of the casing so as to be able to displace in the axial direction. The pinion shaft has pinion teeth that are formed on the tip half section in the axial direction thereof and that engage with the rack teeth, and with the base end section in the axial direction thereof protruding to the outside through the opening section of the sub housing section of the casing, is supported inside the sub housing section so at to be able to rotate freely. The rolling bearing comprises an inner ring, and an outer ring and a plurality of rolling bodies (balls or rollers). The inner ring has an inner raceway around the outer circumferential surface, and the outer ring has an outer raceway around the inner circumferential surface. The plurality of rolling bodies are provided between the inner raceway and outer raceway so as to be able to roll freely. In order to support the pinion shaft inside the sub housing section, the inner ring is fastened around a portion of the pinion shaft that is closer to the base end section side in the axial direction than the portion where the pinion teeth are formed, and with one side surface in the axial direction of the outer ring being in contact with a stepped surface that is formed around the inner circumferential surface of the sub housing section, the outer ring is fitted inside and supported to the sub housing section. Moreover, the retaining ring that has an incomplete circular ring shape is located around the middle section in the axial direction of the pinion shaft such that a radially outside portion is fastened to a fastening groove that is formed around the inner circumferential surface near the opening section of the sub housing section. In this state, one side surface in the axial direction of the radially inside portion thereof is pressed against the other side surface in the axial direction of the outer ring.

The diameter reduction prevention section is provided on part of a member that is fastened to the sub housing section, and by engaging with the retaining ring, prevents reduction of the diameter of the retaining ring. As an embodiment of this diameter reduction prevention section engaging with the retaining ring, construction is possible in which the diameter reduction prevention section is inserted into a non-continuous area (opening section) of the retaining ring, or construction is possible in which the diameter reduction prevention section is fitted inside the inner circumferential surface of the retaining ring.

In the case where the diameter reduction prevention section is inserted in the non-continuous area of the retaining ring, the diameter reduction prevention section can be constructed, for example, so as to comprise, of a clip provided with a radially outside arm section and a radially inside arm section, the clip being elastically mounted to the opening side end section of the sub housing section so as to span the opening side end section, a tip-end section of the radially inside arm section that is placed on the inside of the sub housing section. Alternatively, the diameter reduction prevention section can be constructed so as to comprise an insertion member that is inserted into a through hole that is formed in the sub housing section, or a portion of a member that is fastened to this insertion member and that protrudes toward the radially inside from the through hole.

In the case where the diameter reduction prevention section is constructed by the tip-end section of the radially inside arm section of the clip, preferably a stopper structure for preventing the clip from coming out from the opening side end section of the sub housing section is provided between the clip and the sub housing section. As this stopper structure, it is possible to employ construction in which an inclined surface that is formed on the outer circumferential surface of the opening side end section of the sub housing section, and that is inclined in a direction such that the thickness of the opening side end section becomes larger toward the opening side comes in contact with an inclined section that is formed on the radially outside arm section of the clip, and that is inclined in a direction so as to become closer to the radially inside arm section toward the tip-end side. Alternatively, it is possible to employ construction in which a radially outside engagement protrusion that is formed on the radially outside arm section of the clip engages with an engagement concave groove that is formed around the outer circumferential surface of the opening side end section of the sub housing section. Furthermore, construction can be employed in which a radially inside engagement protrusion that is formed on the tip-end section of the radially inside arm section of the clip engages with a fastening groove that is formed around the inner circumferential surface of the sub housing section.

On the other hand, in the case of construction in which the diameter reduction prevention section is constructed by the insertion member that is inserted into a through hole that is formed in the sub housing section, it is possible to employ construction in which the insertion member is a flat plate shaped key member that is pressure fitted into the through hole, or is fastened to the casing by plastically transforming part the key member. Alternatively, the insertion member can comprise a bolt, and the diameter reduction prevention section can comprise the head section of this bolt, or a nut that is screwed onto the shaft section of this bolt.

Moreover, the dimension reduction prevention section can be formed on the end section of a cover that is fitted inside the opening section of the sub housing section and that covers the circumference of the pinion shaft. In this case, a concave and convex engagement section for regulating relative rotation of the cover with respect to the sub housing section can be provided between the cover and the sub housing section. Furthermore, it is also possible to have the end section of the cover on the opposite side from the side where the diameter reduction prevention section is provided to come in contact with part of a vehicle body by way a gasket made of an elastic material.

Preferably, the orientation of the retaining ring in the circumferential direction is regulated by arranging the retaining ring so that the non-continuous area is located on the rack shaft side.

Effect of Invention

With the present invention, a rack and pinion steering gear unit is achieved that has construction that is capable of effectively preventing displacing in the axial direction of a rolling bearing for supporting a pinion shaft so as to be able to rotate freely, and this construction can be compact and low cost. In other words, the rack and pinion steering gear can be made compact by using a retaining ring, the radially outside portion of which is fastened to a fastening groove that is formed around the inner circumferential surface of the sub housing section of the casing, for preventing displacement of the rolling bearing in the axial direction. Moreover, by causing the diameter reduction prevention section to engage with the retaining ring, it is possible to effectively prevent displacement in the axial direction of the rolling bearing due to a reduction in the diameter of the retaining ring even when a force that would reduce the diameter of the retaining ring acts on the retaining ring due to a force that is applied to the pinion shaft during steering. Furthermore, in order to prevent a reduction of the diameter of the retaining ring in this way, the shapes of the retaining ring and fastening groove do not have to be complex shapes, so the construction can be low cost.

MODES FOR CARRYING OUT INVENTION

First Example

Figure 1:
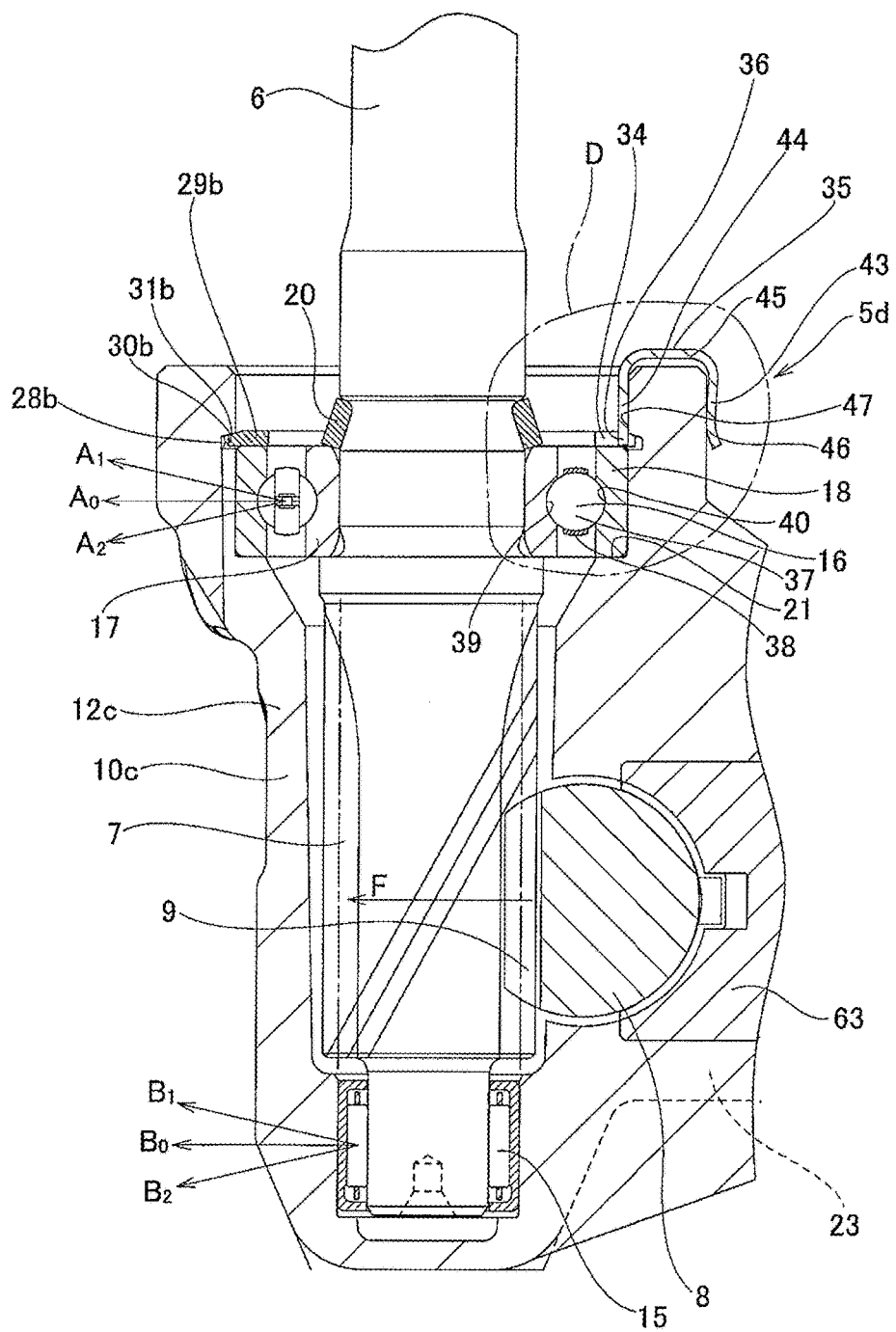
FIG. 1 is a cross-sectional view illustrating an engagement section between a rack and pinion of a steering gear unit of a first example of an embodiment of the present invention.
Figure 2:
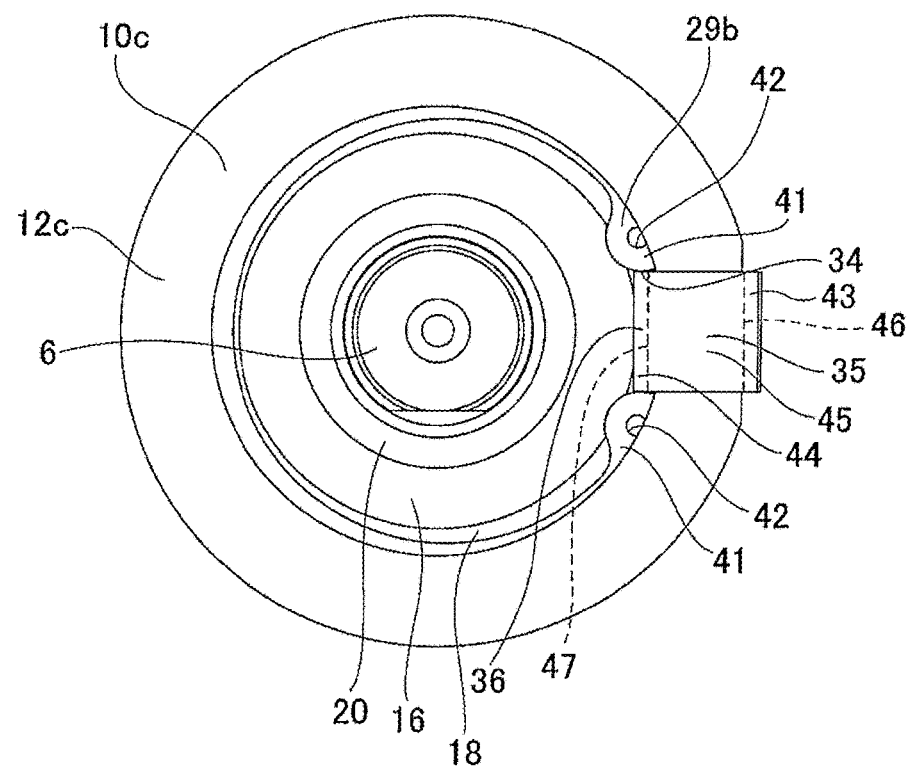
FIG. 2 is a view as seen from the top in FIG. 1.
Figure 3:
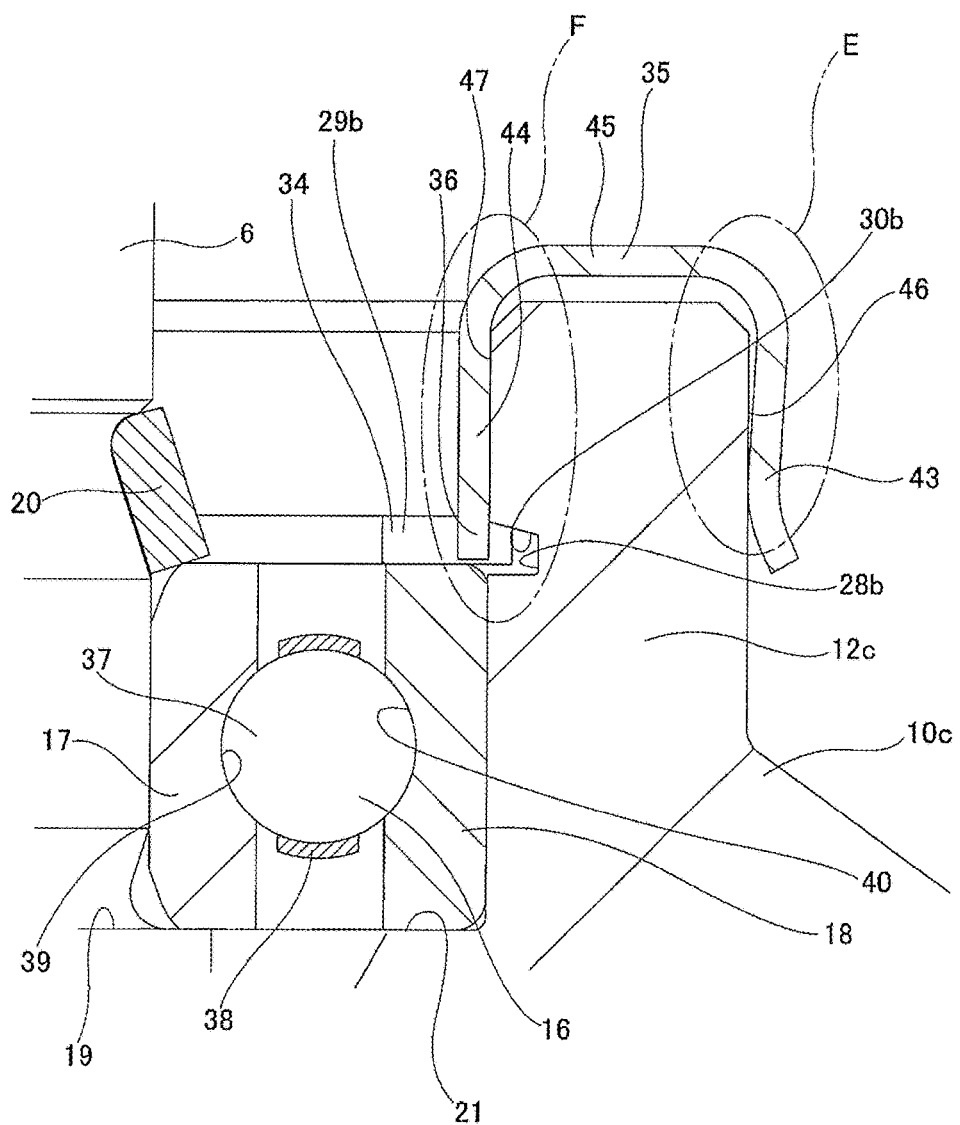
FIG. 3 is an enlarged view of section D in FIG. 1.

FIG. 1 to FIG. 3 illustrate a first example of an embodiment of the present invention. In the steering gear unit 5d of this example as well, pinion teeth 7 that are provided in the axial direction on part of a pinion shaft 6 engages with rack teeth 9 that are provided on the front surface of a rack shaft 8. Part of each of the pinion shaft 6 and the rack shaft 8 are housed inside a casing 10c. This casing 10c has a main housing section 11 (see FIG. 28 and FIG. 29) and a sub housing section 12c that are both cylindrical shaped. The main housing section 11 is open on both ends. The sub housing section 12c is provided on one side of the main housing section 11, and one end (top end in FIG. 1 and FIG. 3) is open. The center axis of the main housing section 11 and the center axis of the sub housing section 12c are in a twisted positional relationship with each other.

Figure 29:
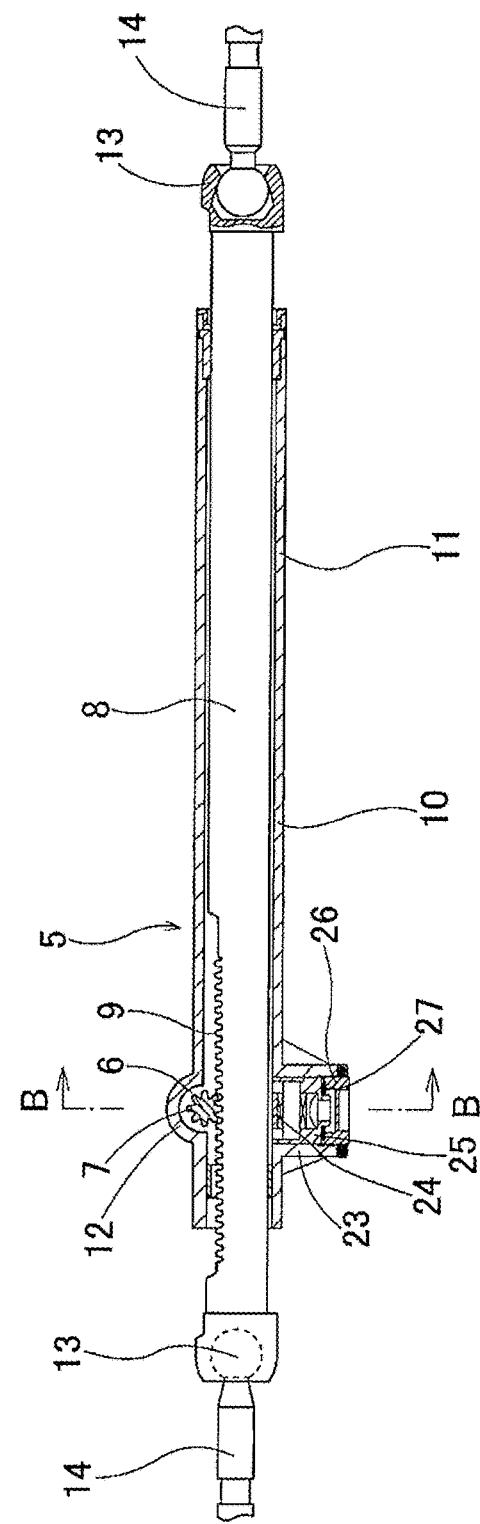
FIG. 29 is a cross-sectional view of section A-A in FIG. 28.
Figure 30:
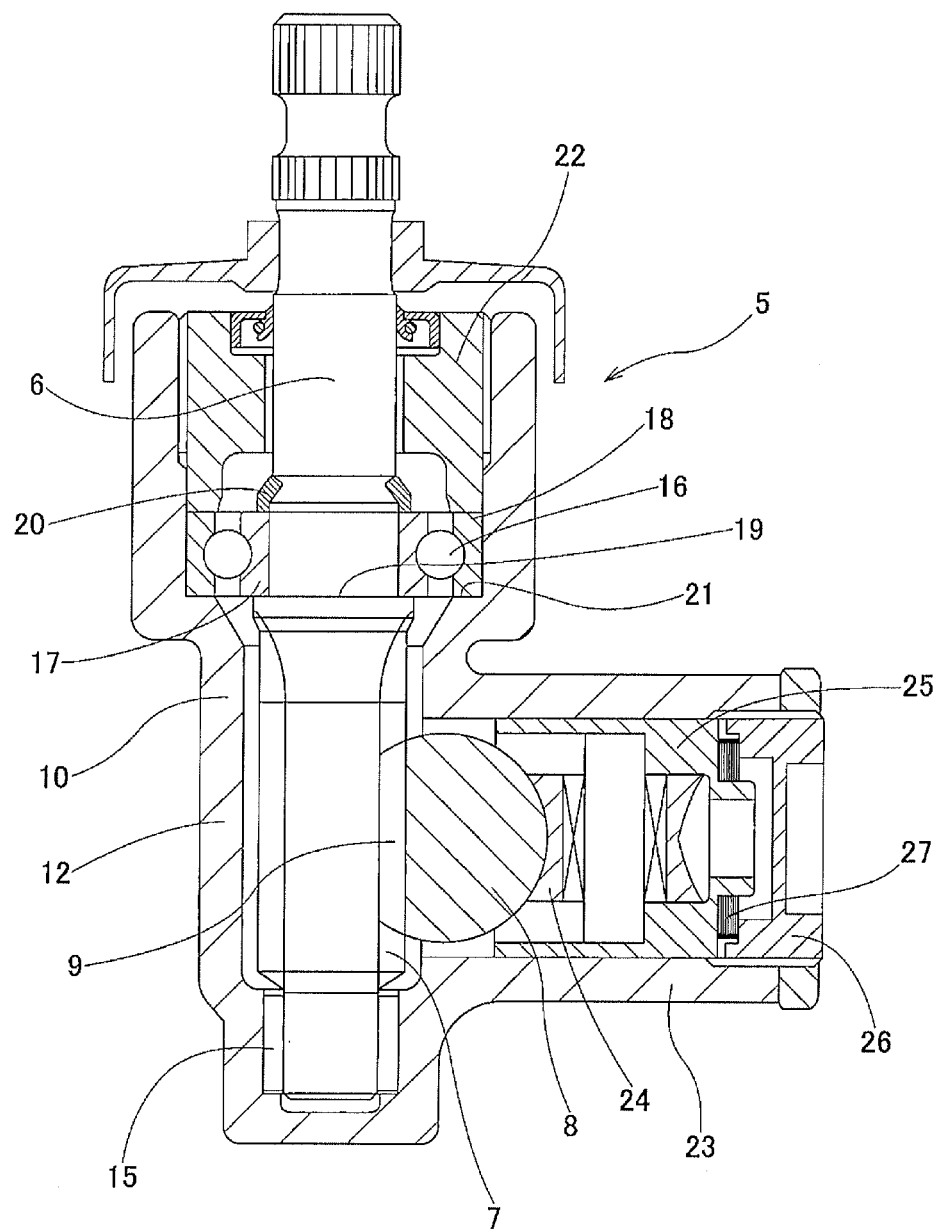
FIG. 30 is a cross-sectional view of section B-B in FIG. 29 and illustrates a state in which the base-end section of a pinion shaft in a state of use.
Figure 31:
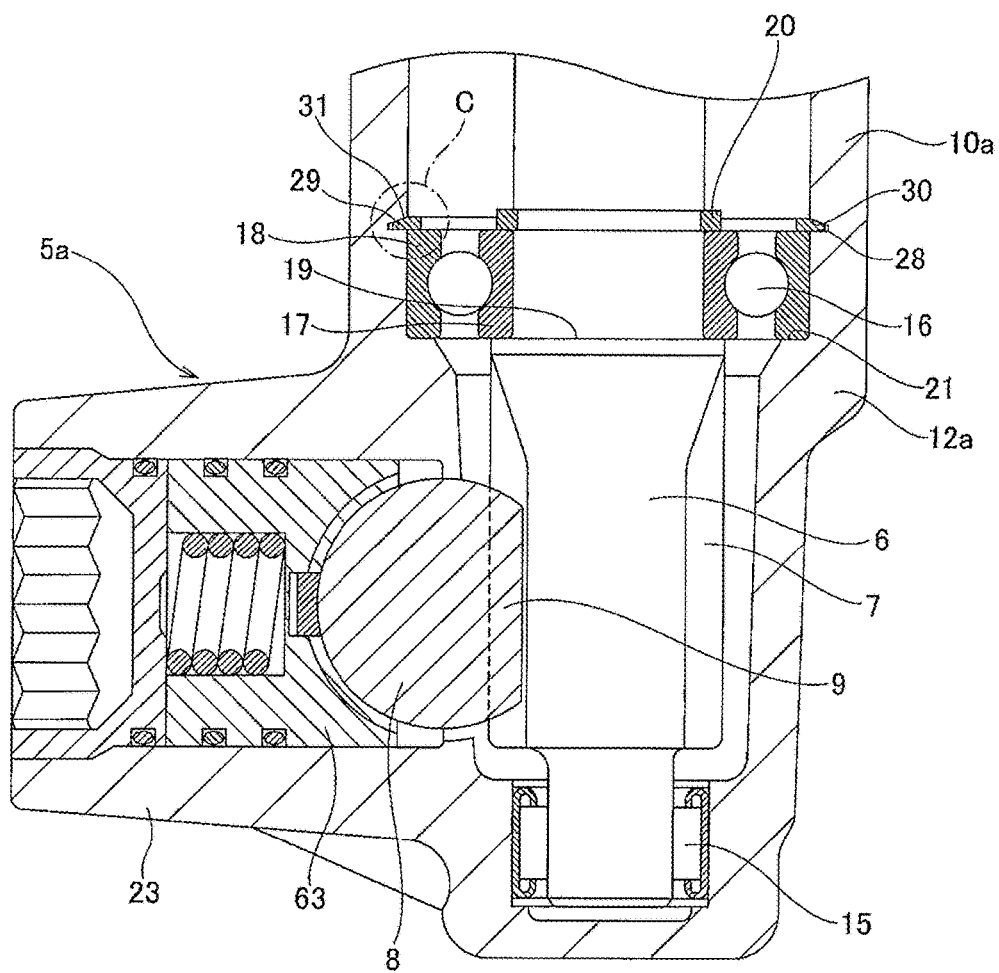
FIG. 31 is a view illustrating a steering gear unit of a second example of conventional construction, and corresponds to section B-B on FIG. 29.
Figure 32:
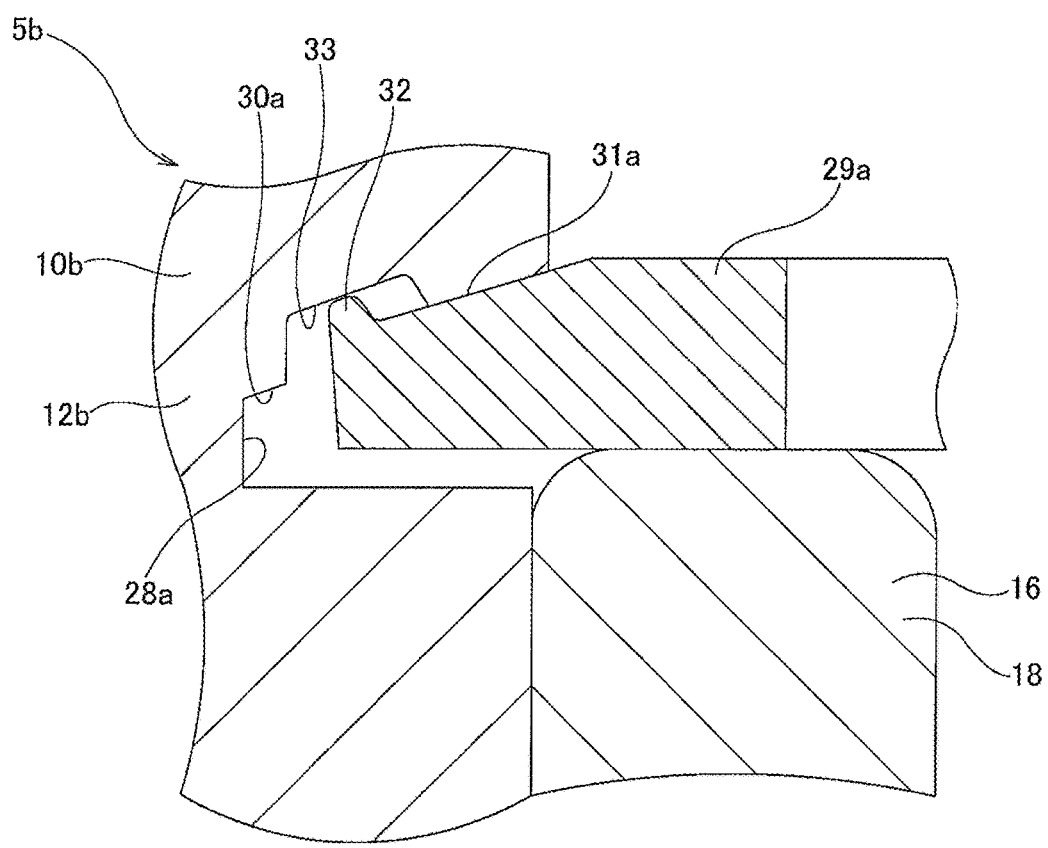
FIG. 32 is an enlarged view illustrating a steering gear unit of a third example of conventional construction, and illustrates a portion that corresponds to section C in FIG. 31.

The rack shaft 8 is inserted through the main housing section 11 so as to be able to displace in the axial direction, and both ends protrude from the main housing section 11. The base-end sections of tie rods 14 are linked to both end sections of the rack shaft 8 by way of spherical joints 13 such as illustrated in FIG. 29. The tip-end sections of the tie rods 14 are linked to the tip-end sections of knuckle arms (not illustrated in the figures) by pivot shafts. A cylinder section 23 is provided in the portion in the radial direction of the main housing section 11 on the opposite side from the sub housing section 12c, and a pressure block 63 is housed inside this cylinder section 23 so as to be able to move in the axial direction. An elastic member such as a spring is provided between a cover (not illustrated in the figures) that is fastened by a screw on the inside of the opening section of the cylinder section 23 and the pressure block 63 to press the pressure block 63 toward the rack shaft 8. As a result, the rack shaft 8 is elastically pressed toward the pinion shaft 6, which eliminates looseness in the engagement section between the pinion teeth 7 and the rack teeth 9. Furthermore, even though a force is applied to the rack shaft 8 in a separating direction away from the pinion shaft 6 due to transmission of power in the engagement section, it is possible to properly maintain the engaged state in the engagement section. Of the surfaces on both ends in the axial direction of the pressure block 63, the inside-end surface of the side that presses the rack shaft 8 is a partial cylindrical concave surface that corresponds to the shape of the rear surface of the rack shaft 8.

Figure 28:
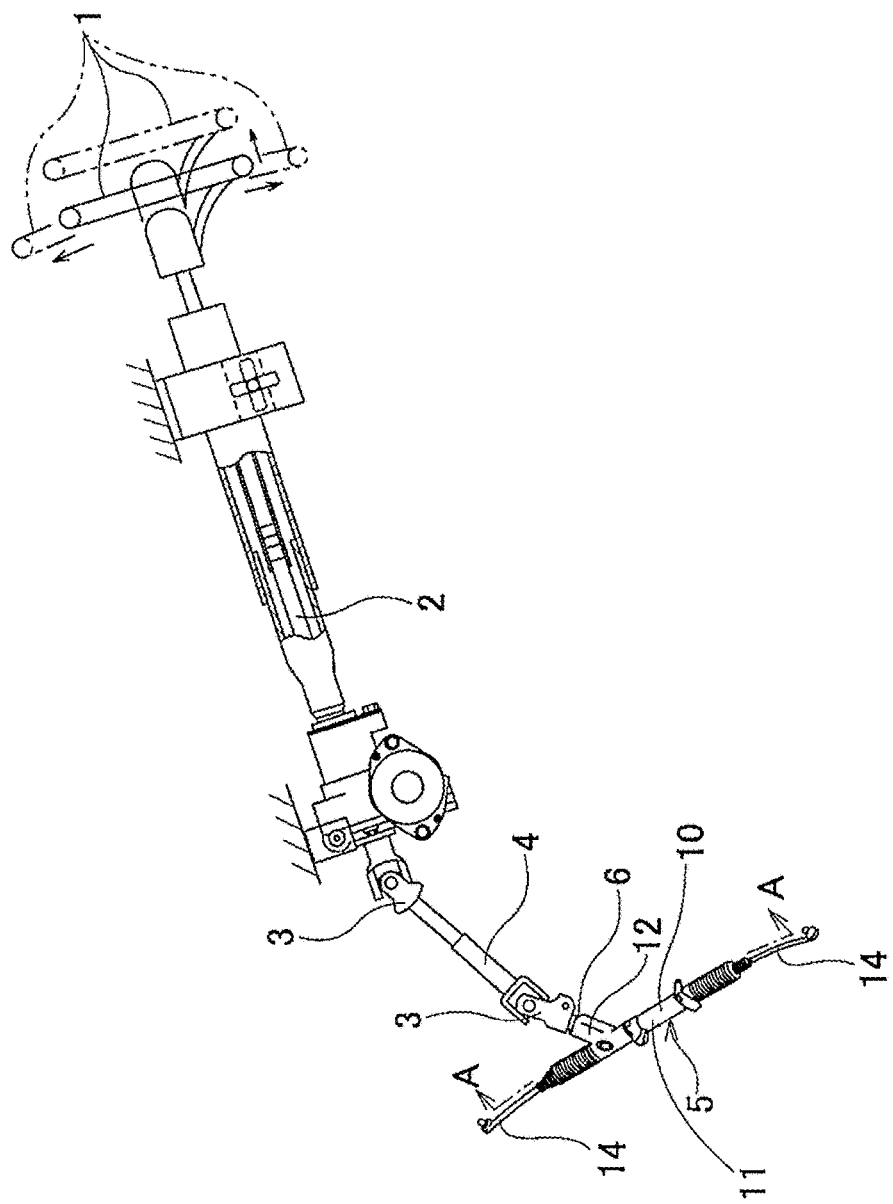
FIG. 28 is a partial cut-away side view of an example of an automobile steering apparatus in which a rack and pinion steering gear unit is assembled.

The tip-end half section (lower half section in FIG. 1) of the pinion shaft 6 where the pinion teeth 7 are formed is supported inside the sub housing section 12c so as only to be able to rotate. In order for this, the tip-end section of the pinion shaft 6 is supported by the rear-end section of the sub housing section 12c by a radial needle bearing 15 so as to be able to rotate freely. Moreover, the middle section of the pinion shaft 6 is supported by the portion near the opening of the sub housing section 12c by way of a deep-groove three-point contact or four-point contact single-row ball bearing 16 so as to be able to rotate freely. On the other hand, the base-end section of the pinion shaft 6 protrudes to the outside from the opening of the sub housing section 12c, and as illustrated in FIG. 28, is linked to an intermediate shaft 4 by way of a universal joint 3.

The ball bearing 16 has an inner ring 17, an outer ring 18, plural balls 37, and a retainer 38. The inner ring 17 has an inner raceway 39 around the outer circumferential surface thereof. The outer ring 18 has an outer raceway 40 around the inner circumferential surface thereof. The balls 37 are provided between the inner raceway 39 and the outer raceway 40 so as to be able to roll freely. Moreover, the retainer 38 has pockets in plural locations in the circumferential direction thereof, and the balls 37 are held inside these pockets so as to be able to roll freely. In order to support the middle section of the pinion shaft 6 on the inside of the sub housing section 12c so as to be able to rotate freely, the inner ring 17 is fastened around the portion of the pinion shaft 6 that is closer to the base-end side (steering wheel 1 side) in the axial direction than the portion where the pinion teeth 7 are formed. The inner ring 17 is held between a radially inside stepped surface 19 that is formed around the middle section of the pinion shaft 6 and a conical shaped retaining ring 20 that is fastened around the middle section of the pinion shaft 6. Moreover, the outer ring 18 is supported inside the sub housing section 12c in a state such that the surface of one side in the axial direction thereof comes in contact with a radially outside stepped surface 21 that is formed around the middle section of the inner circumferential surface of the sub housing section 12c.

A fastening groove 28b is formed around the entire inner circumferential surface of a portion of the sub housing section 12c near the opening. The radially outside portion of the incomplete circular (C shaped) retaining ring 29b that is located around the middle section in the axial direction of the pinion shaft 6 is fastened in the fastening groove 28b, and in that state, one side surface of the radially inside portion of this retaining ring 29b is pressed against the other side surface in the axial direction of the outer ring 18.

The retaining ring 29b is formed into a C-shaped incomplete circular shape by punching a metal plate made of an elastic material such as spring steel, stainless spring steel or the like, and when assembled has an elastic force that acts in a direction that expands the diameter. A pair of fastening arms 41 that protrude inward in the radial direction are provided on the opposing portions of both sides of the non-continuous area 34 of the retaining ring 29b. Fastening holes 42 for fitting with the tip-end sections of a diameter reduction tool (not illustrated in the figure) are formed in the center section of the fastening arm sections 41.

Of the fastening groove 28b, the side surface 30b on the opening side (upper side in FIG. 1 and FIG. 3) of the sub housing section 12c is inclined in a direction such that the width dimension of the fastening groove 28b increases toward the inside in the radial direction. Moreover, of the retaining ring 29b, a tapered surface 31b is formed in the portion that comes in contact with the side surface 30b, and the cross-sectional shape of the radially outside portion of this retaining ring 29b is inclined in a direction such that the thickness dimension in the axial direction becomes smaller toward the outside in the radial direction, forming a wedge shape. As a result, with the retaining ring 29b fastened in the fastening groove 28b, the force in the axial direction caused by the elastic force in the direction expanding the diameter presses the surface on the other side in the axial direction of the outer ring 18, and applies a preload to the ball bearing 16.

Moreover, with the retaining ring 29b fastened in the fastening groove 28b, the non-continuous area 34 is located in the portion on the rack 8 side of the retaining ring 29b (portion on the right side in FIG. 1). In other words, in order to eliminate backlash in the engagement section between the pinion teeth 7 and the rack teeth 9, the rack shaft 8 is elastically pressed toward the pinion shaft 6, however this pressing force (reaction force of the rack, or force in the direction of arrow F in FIG. 1) is supported by the portions of the radial needle bearing 15 and ball bearing 16 on the non-rack 8 side (portion on the left side in FIG. 1). In this case, presuming that there is no twist in the rack teeth 9, forces in the directions of arrows $A_0$ and $B_0$ act on the radial needle bearing 15 and ball bearing 16 in directions orthogonal to the center axis of the bearings. However, in the case where there is twist in the rack teeth 9, forces in the directions of arrows $A_1$ ($A_2$) and $B_1$ ($B_2$), which are inclined with respect to arrows $A_0$ and $B_0$, act on the radial needle bearing 15 and ball bearing 16 in directions orthogonal to the center axis of the bearings. Of these forces, in the case of a force that acts in the $A_1$ direction, a force also acts on the retaining ring 29b by way of the ball bearing 16. Here, the incomplete circular retaining ring 29b is such that the rigidity of the non-continuous area 34 and portion nearby is low, so when the non-continuous area 34 is located on the non-rack shaft 8 side, the retaining ring 29b deforms and it becomes easy for the retaining ring 29b to come out from the fastening groove 28b. Therefore, with the retaining ring 29b fastened, the non-continuous area 34 is located on the rack shaft 8 side.

Particularly, in order to prevent contraction of the diameter and prevent rotation of the retaining ring 29b, a clip 35 is mounted in the portion on the rack shaft 8 side (the right side portion of FIG. 1 and FIG. 2) of the end section on the opening side (edge section of the opening) of the sub housing section 12c of the casing 10c in a state spanning this section. The clip 35 is formed by bending an elastic and non-corrosive plate material such as stainless spring steel or the like into a U shape, and this clip 35 has a radially outside arm section 43 and radially inside arm section 44 that are arranged so as to be parallel with each other, and a base section 45 that connects the base end sections of the radially outside arm section 43 and radially inside arm section 44. The radially outside arm section 43 and radially inside arm section 44 elastically hold a radially outside flat surface section 46 and radially inside flat surface section 47 that are parallel with each other from both sides, and that are provided on the rack shaft 8 side of the end section on the opening side of the sub housing section 12c, and in this state, cause the inside surface of the base end section 45 to come close to or come in contact with the end surface on the opening side of the sub housing section 12c. Moreover, with the clip 35 mounted to the sub housing section 12c in this way, the tip-end section of the radially inside arm section 44 that is provided on the inside of the sub housing section 12c is inserted into the non-continuous area 34 of the retaining ring 29b. Therefore, in this example, the tip-end section of the radially inside arm section 44 corresponds to a diameter reduction prevention section 36. With this kind of construction, together with preventing further reduction of the diameter of the retaining ring 29b, rotation of the retaining ring 29b is prevented. In order for this, the width dimension of the tip-end section of the radially inside arm section 44 (diameter reduction prevention section 36) is a little less than the width dimension of the non-continuous area 34 in a state in which the retaining ring 29c is fastened (state in which the retaining ring 29c is reduced a little from the free state).

In the case of the steering gear unit 5d of this example, it is possible to effectively prevent the ball bearing 16 that supports the pinion shaft 6 so as to rotate freely from displacing in the axial direction, and this kind of construction can be compact and low cost. In other words, together with using the retaining ring 29b, together with preventing the ball bearing 16 from displacing in the axial direction, a preload is applied to this ball bearing 16. Therefore, when compared with construction that uses a conventional pressure screw cylinder, the overall length of the sub housing unit 12 can be easily reduced, and the apparatus can be made compact. Moreover, a diameter reduction prevention unit 36 that is made up of the tip-end section of the radially inside arm section 44 of the clip 35 is inserted into the non-continuous area 34 of the retaining ring 29b. Therefore, even when a force that would reduce the diameter inward (force in the radial direction) acts on the retaining ring 29b due to a force that is applied to the pinion shaft 6 during steering, it is certainly possible to prevent reduction of the diameter of the retaining ring 29b. As a result, it is possible to prevent the retaining ring 29b from displacing in the axial direction, and so it is possible to effectively prevent the ball bearing 16 from displacing in the axial direction. In the construction of this example, the shapes of the retaining ring and fastening groove are not complex, so the retaining ring and fastening groove can be made at low cost.

Moreover, the non-continuous area 34 of the retaining ring 29b is located on the rack shaft 8 side, and the portion of the retaining ring 29c where the rigidity is low is located on the far side (opposite side in the radial direction) from the direction that the rack reaction force acts. Therefore, when a large force is applied from the rack shaft 8 to the pinion shaft 6 such as when the tires roll up onto a curb when the automobile is moving, it is possible to effectively prevent the retaining ring 29b from displacing, and thus it becomes difficult for the retaining ring 29b to separate from the fastening groove 28b. The retaining ring 29b is prevented from rotating, so it is possible to effectively prevent the retaining ring 29b from separating from the fastening groove 28b over a long period of time. The construction and effect of the other parts of this example are the same as that of conventional construction.

Second Example

Figure 4:
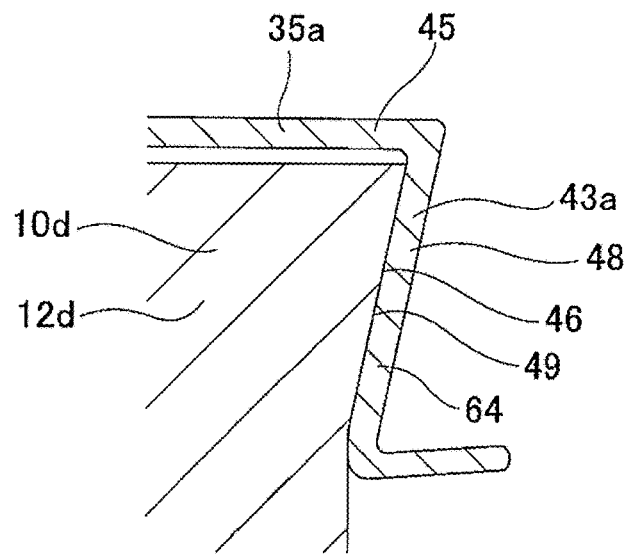
FIG. 4 is a cross-sectional view illustrating a portion that corresponds to section E in FIG. 3 of a steering gear unit of a second example of an embodiment of the present invention.

FIG. 4 illustrates a second example of an embodiment of the present invention. A feature of this example is that a stopper structure 48 is provided for preventing the clip 35a that is mounted on the end section of the opening side of the sub housing section 12d of the casing 10d from coming out in the axial direction (opening side of the sub housing section 12d).

In this example, an inclined surface 49 that is inclined in a direction such that the thickness of the end section on the opening side becomes larger toward the opening side of the sub housing section 12d is formed on a radially outside flat surface section 46 on the outer circumferential surface of the sub housing section 12d. Moreover, an inclined section 64 that is inclined in a direction so as to become closer to the radially inside arm section 44 (see FIG. 1 to FIG. 3) toward the tip-end side is formed from the base-end section to the middle section of the radially outside arm section 43a of the clip 35a. The stopper structure 48 is formed by causing the inclined section 64 to come in contact with and engage with the inclined surface 49.

Therefore, even when a force acts on the clip 35a in a direction toward the opening side of the sub housing section 12d (upward in FIG. 4) when traveling over a bad road, it is possible to effectively prevent the clip 35a from falling out from the sub housing section 12d, and it is possible to stably prevent reduction of the diameter of the retaining ring 29b (see FIG. 1 to FIG. 3) and prevent the retaining ring 29b from coming out from the fastening groove 28b (see FIG. 1 to FIG. 3). The other construction and effects of this example are the same as in the first example.

Third Example

Figure 5:
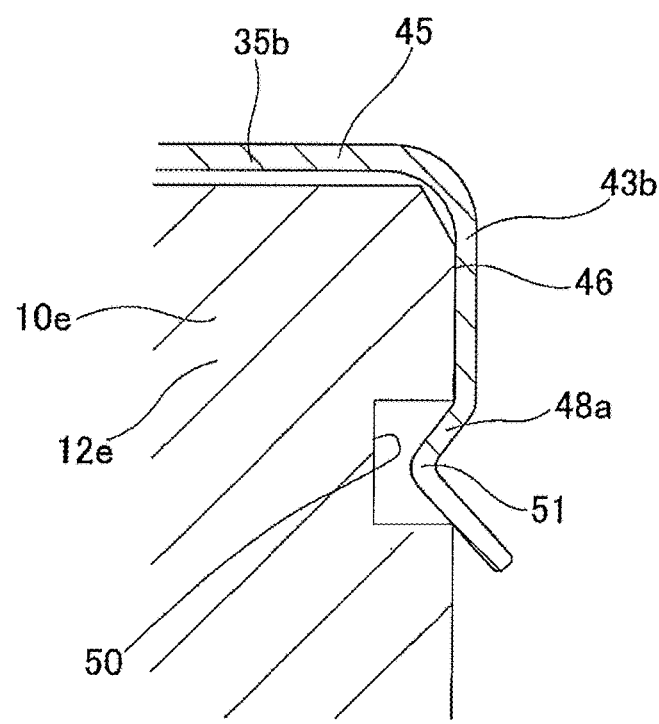
FIG. 5 is a cross-sectional view illustrating a portion that corresponds to section E in FIG. 3 of a steering gear unit of a third example of an embodiment of the present invention.

FIG. 5 illustrates a third example of an embodiment of the present invention. In the case of this example, as in the case of the second example described above, the clip 35b is prevented from falling out by providing a stopper structure 48a between the clip 35b and the sub housing section 12e of the casing 10e.

A fastening concave groove 50 having a rectangular cross section is formed in the radially outside flat surface section 46 of the outer circumferential surface of the end section of the opening side of the sub housing section 12e. Moreover, a radially outside engagement protruding section 51 having a V-shaped cross section that protrudes in a direction so as to become closer to the radially inside arm section 44 (see FIG. 1 to FIG. 3) is formed in the portion near the tip end of the radially outside arm section 43b of the clip 35b. A stopper structure 48a is formed by the radially outside engagement protruding section 51 engaging with the fastening concave groove 50.

In the case of this example having this kind of construction, as in the case of the construction of the second example, it is possible to effectively prevent the clip 35b from falling out from the sub housing section 12e. The other construction and effect of this example are the same as in the first example and second example.

Fourth Example

Figure 6:
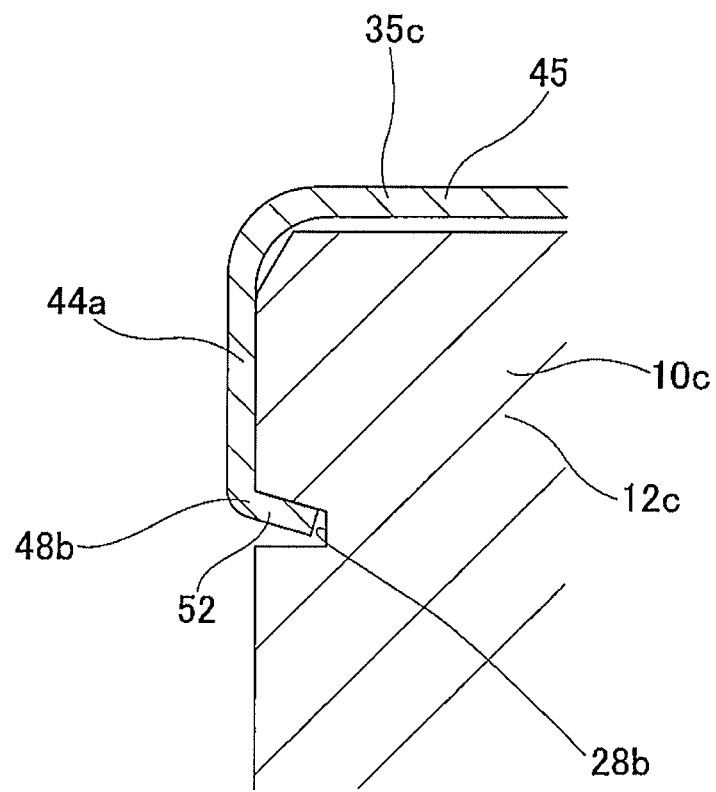
FIG. 6 is a cross-sectional view illustrating a portion that corresponds to section F in FIG. 3 of a steering gear unit of a fourth example of an embodiment of the present invention.
Figure 7:
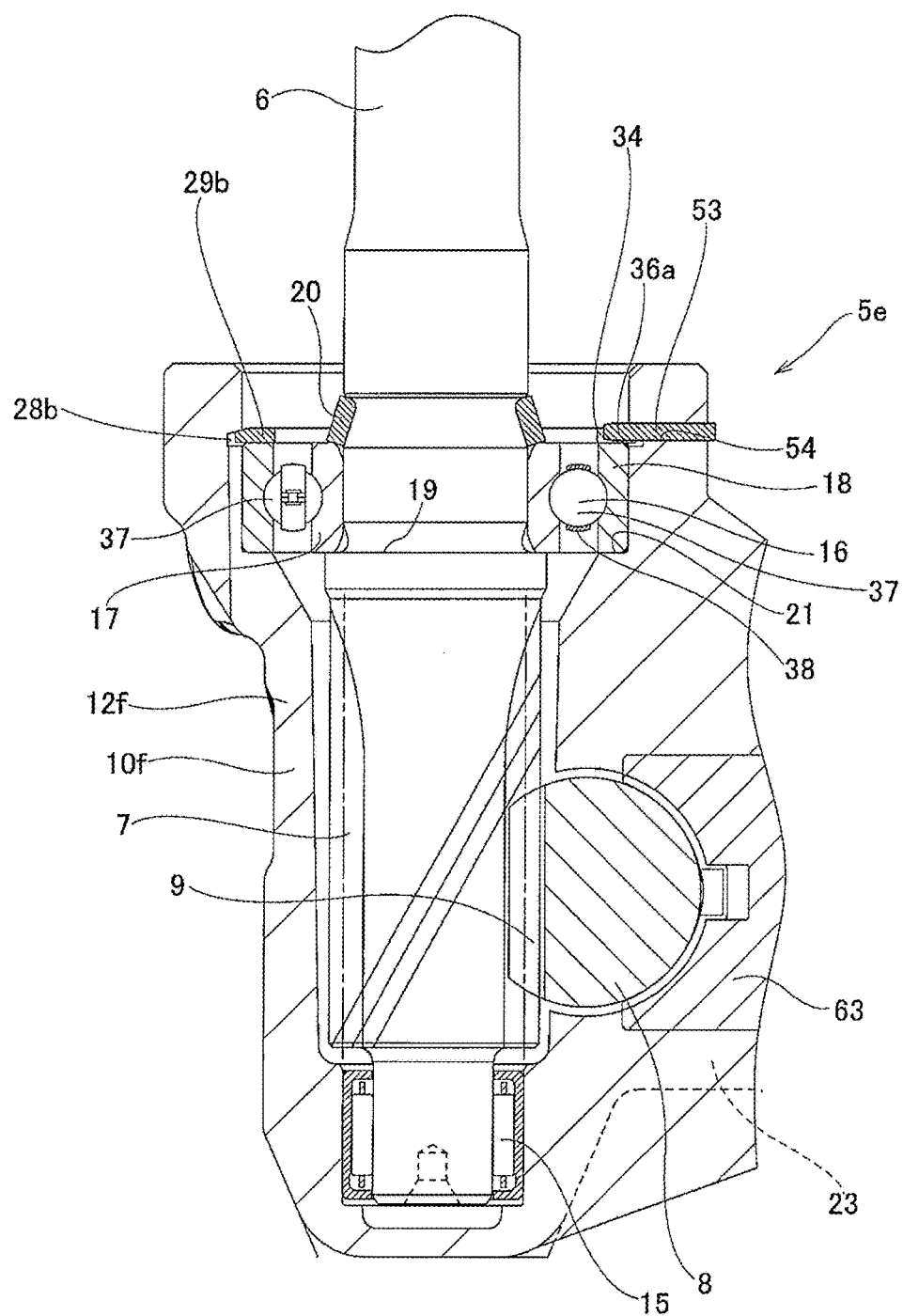
FIG. 7 is a vertical cross-sectional view illustrating an engagement section between a rack and pinion of a steering gear unit of a fifth example of an embodiment of the present invention.
Figure 8:
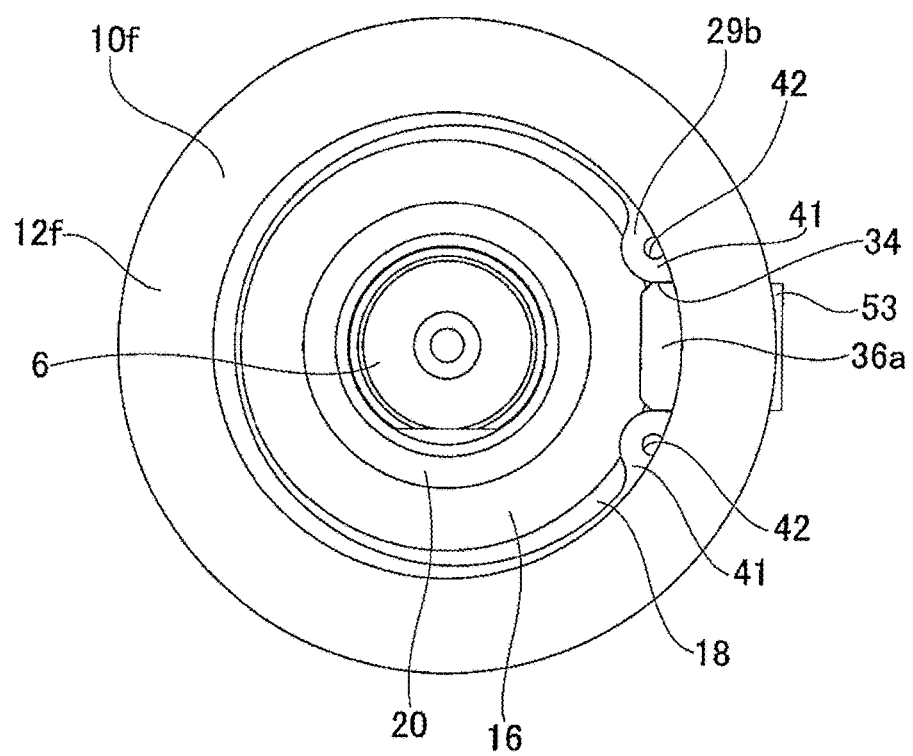
FIG. 8 is a view as seen from the top in FIG. 7.
Figure 9:
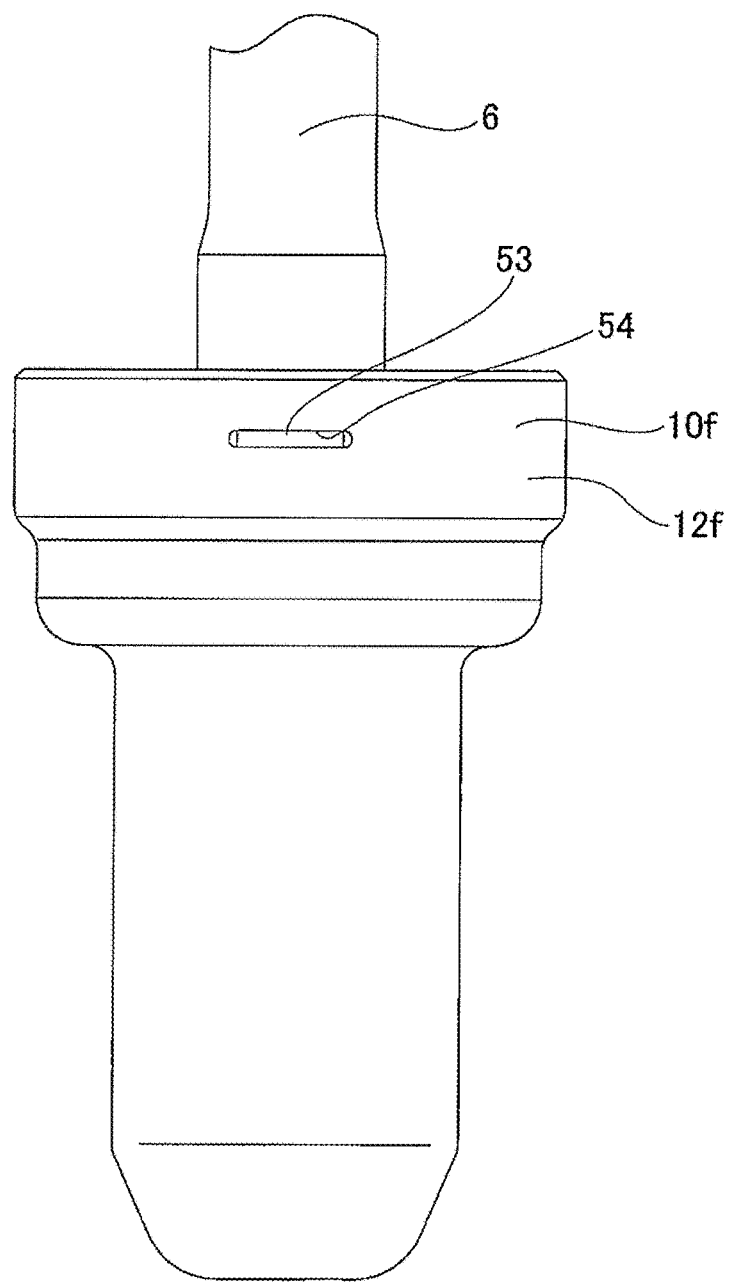
FIG. 9 is a view as seen from the right side in FIG. 7, and illustrates a state in which the cylinder section and main housing section are omitted.
Figure 10:
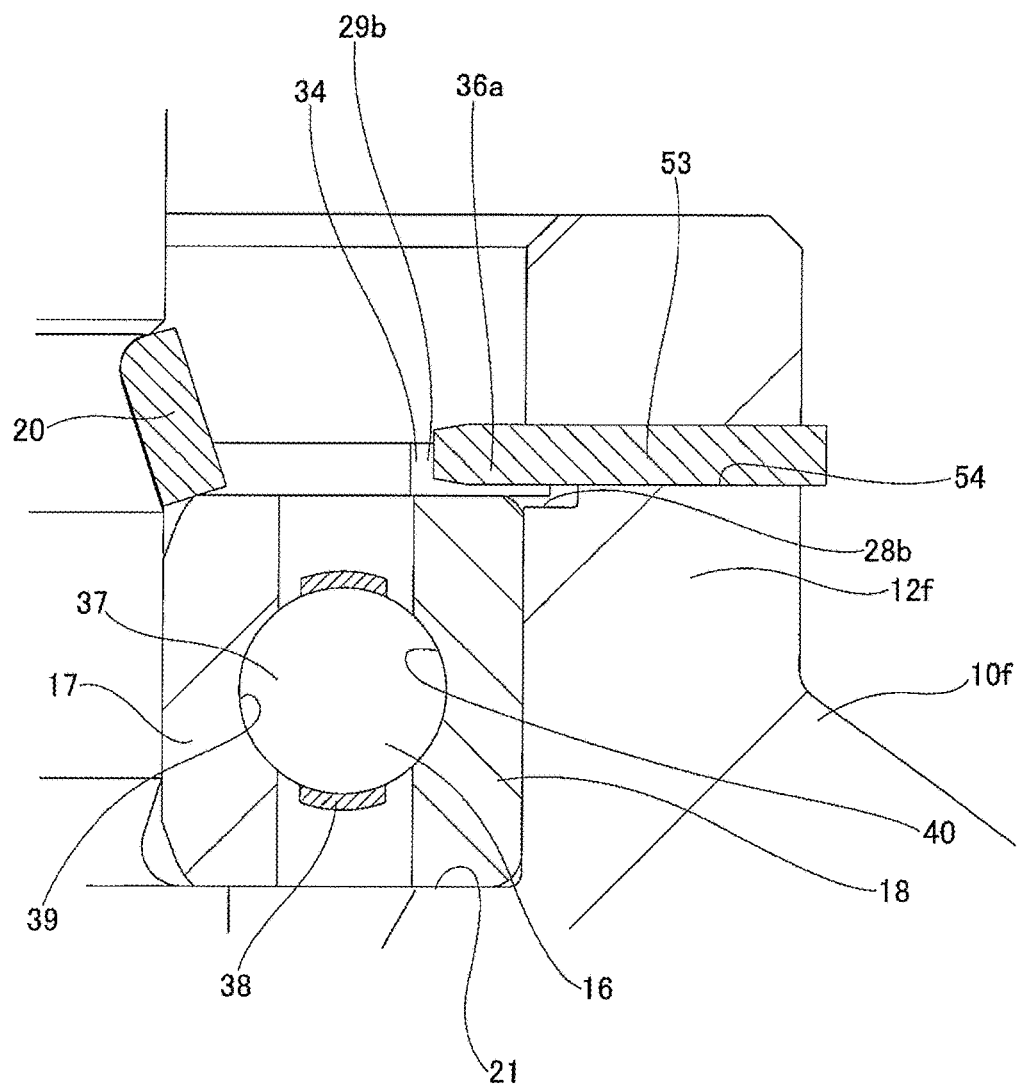
FIG. 10 is an enlarged cross-sectional view of a steering gear unit of a fifth example of an embodiment of the present invention, and illustrates a portion that corresponds to FIG. 3.
Figure 11:
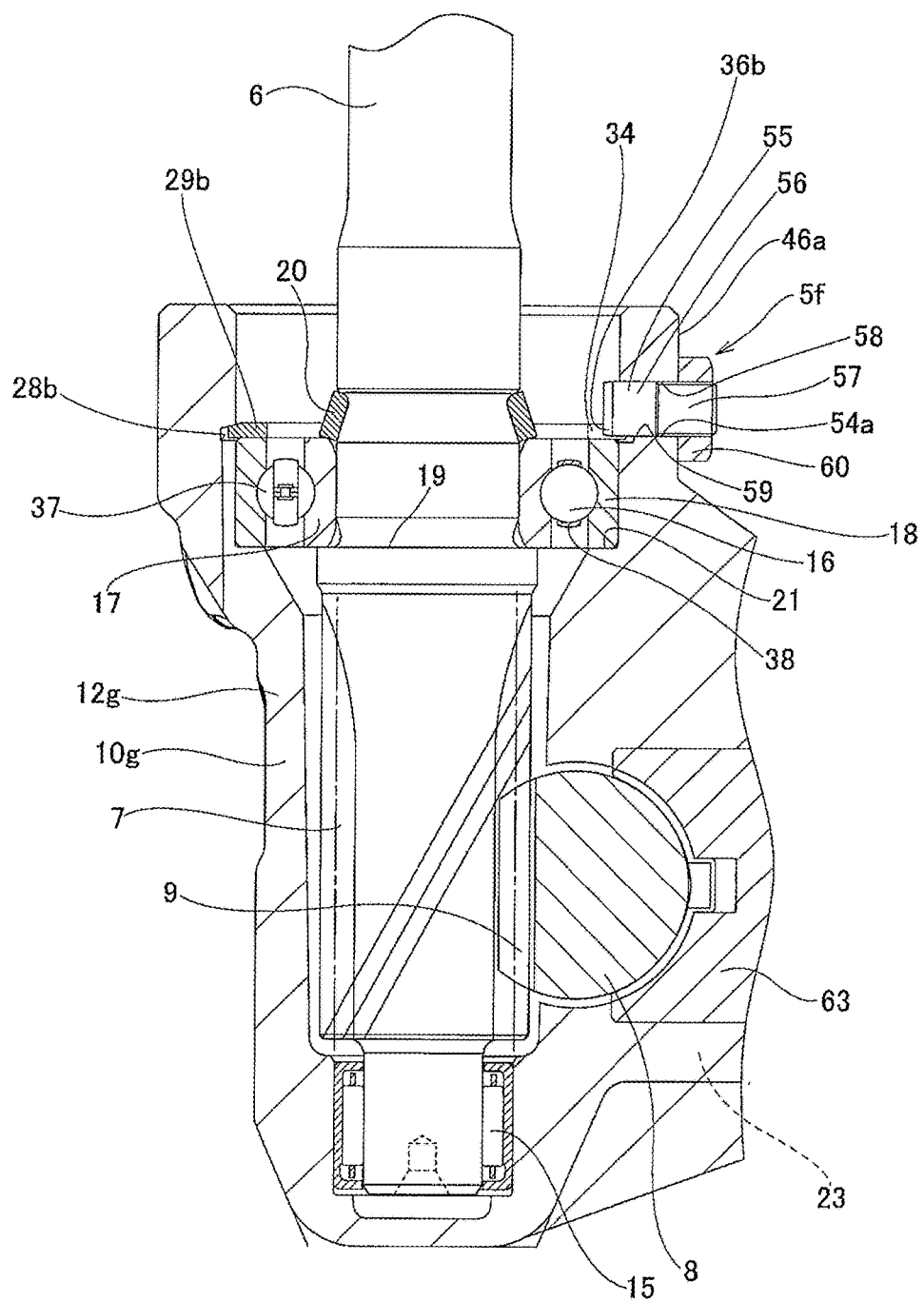
FIG. 11 is a vertical cross-sectional view illustrating an engagement section between a rack and pinion of a steering gear unit of a sixth example of an embodiment of the present invention.
Figure 12:
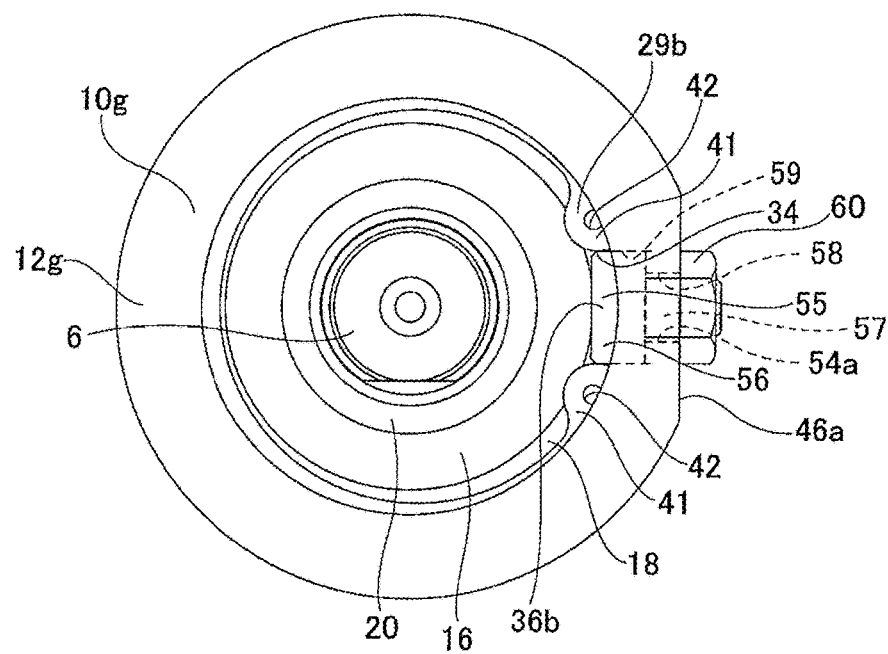
FIG. 12 is a view as seen from the top in FIG. 11.
Figure 13:
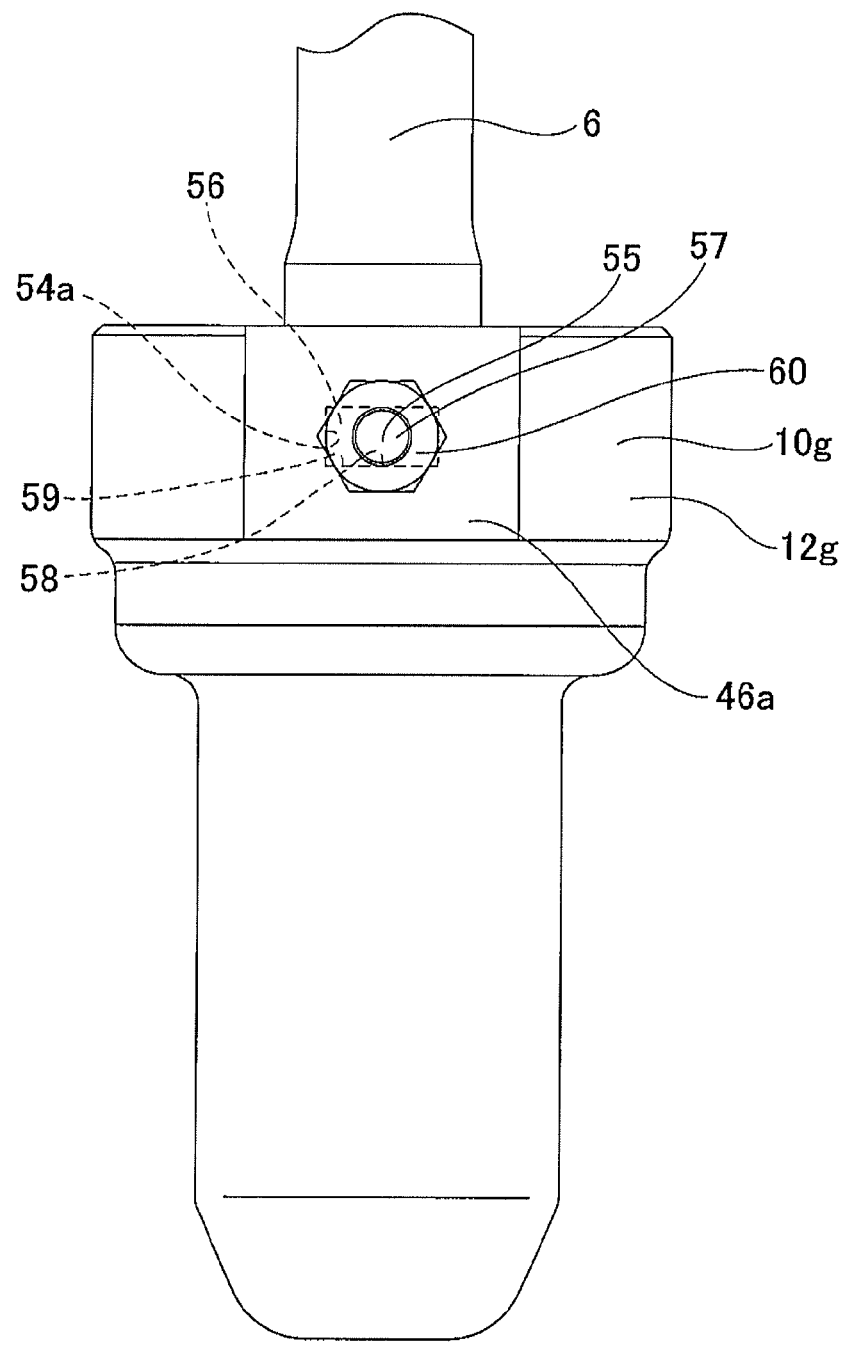
FIG. 13 is a view as seen from the right side in FIG. 11, and illustrates a state in which the cylinder section and main housing section are omitted.
Figure 14:
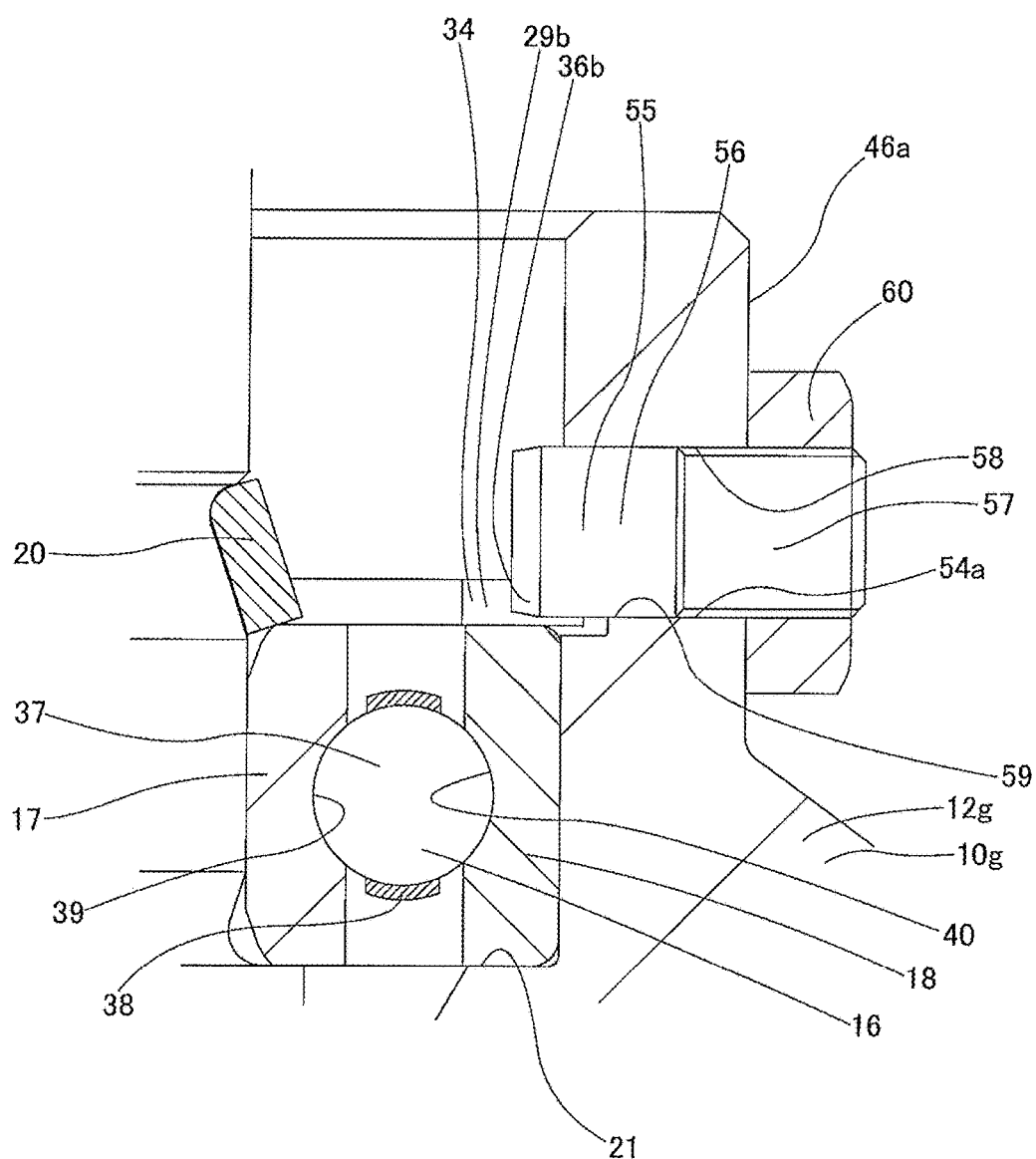
FIG. 14 is an enlarged cross-sectional view of a steering gear unit of a sixth example of an embodiment of the present invention, and illustrates a portion that corresponds to FIG. 3.

FIG. 6 illustrated a fourth example of an embodiment of the present invention. In the case of this example, as in the case of the second and third example of an embodiment, a stopper structure 48b is provided between the clip 35c and the sub housing section 12c of the casing 10c, which prevents the clip 35c from falling out.

In this example, the tip-end section of the radially inside arm section 44a of the clip 35c is bent at nearly a right angle in a direction so as to become closer to the radially outside arm section 43 (see FIG. 1 to FIG. 3) and forms a radially inside engagement protruding section 52 in that portion. With the tip-end section of the radially inside arm section 44a inserted into the non-continuous area 34 of the retaining ring 29b (see FIG. 1 to FIG. 3), a stopper structure 48b is formed by the radially inside engagement protruding section 52 engaging with the fastening groove 28b that is formed around the inner circumferential surface of the sub housing section 12c for fastening the retaining ring 29b.

In the case of this example as well, as in the case of the construction of the second and third examples, it is possible to effectively prevent the clip 35c from falling out from the sub housing section 12c. Moreover, the clip 35c is stopped from coming out by using the fastening groove 28b, so it is not necessary to perform special processing on the sub housing section 12c in order to stop the clip 35c from coming out. Therefore, it is possible to keep the processing cost low. The stopper structure 48b can also be implemented together with the stopper structure 48, 48a of the second or third example of an embodiment. The other construction and effects of this example are the same as in the first through the third examples.

Fifth Example

FIG. 7 to FIG. 10 illustrate a fifth example of an embodiment of the present invention. A feature of the steering gear unit 5e of this example is that the diameter of the retaining ring 29b is prevented from becoming reduced by inserting a diameter reduction prevention section 36a that is formed on part of a rectangular flat plate shaped key member 53 into a non-continuous area 34 of the retaining ring 29b.

In this example, a through hole 54 that has a rectangular shaped cross section is formed in the portion on the rack shaft 8 side in the circumferential direction (right side portion in FIG. 7 and FIG. 8) near the opening of the sub housing section 12f of the casing 10f so as to pass through this portion in the radial direction. A rectangular plate shaped key member 53 that is made of metal plate such as stainless steel plate is pressure fitted into the through hole 54, and key member 53 is fastened to the casing 10f. Moreover, of this key member 53 that is fastened in this way, the portion that protrudes toward the radially inside from the through hole 54 is inserted into the non-continuous area 34 of the retaining ring 29b as a diameter reduction prevention section 36a.

In the case of this example as well, when, due to a force that is applied to the pinion shaft 6 when steering, a force acts on the retaining ring 29b that would reduce the diameter thereof, it is possible to prevent reduction of the diameter of the retaining ring 29b. As a result, it is possible to prevent the retaining ring 29b from displacing in the axial direction, and thus it is possible to effectively prevent the ball bearing 16 from displacing in the axial direction.

Moreover, by using a compact key member 53 with a simple shape it is possible to prevent reduction of the diameter of the retaining ring 29b, so when compared with using a clip 35 to 35c such as in the first through fourth examples, it is possible to reduce the cost of materials, as well as to reduce the processing cost. Furthermore, the key member 53 is fastened to the casing 10f by being pressure fitted into the through hole 54, so when compared with using a clip 35 to 35c, it is possible to effectively prevent the key member 53 from falling out. In order to fasten the key member to the casing 10, it is possible to plastically deform (crimp and deform) the portion of the key member that protrudes from the outer circumferential surface of the sub housing section. The other construction and effects of this example are the same as in the first example.

Sixth Example

FIG. 11 to FIG. 14 illustrate a sixth example of an embodiment of the present invention. A feature of the steering gear unit 5f of this example is that reduction of the diameter of the retaining ring 29b is prevented by inserting a diameter reduction prevention section 36b that is provided on part of a bolt 55 into a non-continuous area 34 of the retaining ring 29b.

In this example, a bolt having a rectangular parallelepiped shaped head section 56, and a column shaped shaft section 57 having male threads formed around the outer circumferential surface thereof is used as the bolt 55. Moreover, a through hole 54a is formed in a portion on the rack shaft 8 side in the circumferential direction (right side portion in FIG. 11 and FIG. 12) near the opening of the sub housing section 12g of the casing 10g so as to pass through this portion. The through hole 54a has a circular hole section 58 that is formed in the radially outside half section, and a non-circular hole section 59 having a square hole shape that is formed in the radially inside half section. Furthermore, a radially outside flat surface section 46a is formed around the portion of the outer circumferential surface of the sub housing section 12g where the through hole 54a (circular hole section 58) is opened.

The shaft section 57 is placed inside the circular hole section 58 by inserting the bolt 55 into the through hole 54a from the radially inside, and the head section 56 is placed inside the non-circular hole section 59 so there is no looseness. In this state, the tip-end section of the shaft section 57 is caused to protrude to the outside from the outer circumferential surface (radially outside flat surface section 46a) of the sub housing section 12g, and the radially inside portion of the head section 56 is caused to protrude to the radially inside from the inside of the non-circular hole section 59. The bolt 55 and nut 60 are fastened to the sub housing section 12g by screwing and fastening the nut 60 to the portion of the shaft section 57 that protrudes from the outer circumferential surface of the sub housing section 12g. Moreover, the portion of the head section 56 of the bolt 55 that protrudes to the radially inside from the non-circular hole section 59 is inserted inside the non-continuous area 34 of the retaining ring 29b as a diameter reduction prevention section 36b.

In the case of this example as well, when, due to a force that is applied to the pinion shaft 6 during steering, a force acts on the retaining ring 29b that would reduce the diameter (inward force in the radial direction), it is definitely possible to prevent reduction of the diameter of the retaining ring 29b. As a result, it is possible to prevent displacement in the axial direction of the retaining ring 29b, and thus it is possible to effectively prevent displacement in the axial direction of the ball bearing 16.

Moreover, the head section 56 of the bolt 55 that is fastened to the sub housing section 12g is used as a diameter reduction prevention section 36b, so it is possible to effectively prevent the diameter reduction prevention section 36b from coming out from the non-continuous area 34 of the retaining ring 29b. Furthermore, by using general parts for the bolt 55 and nut 60, it is possible to reduce costs. The construction and effects of the other parts of this example are the same as in the first and fifth examples.

Seventh Example

Figure 15A:
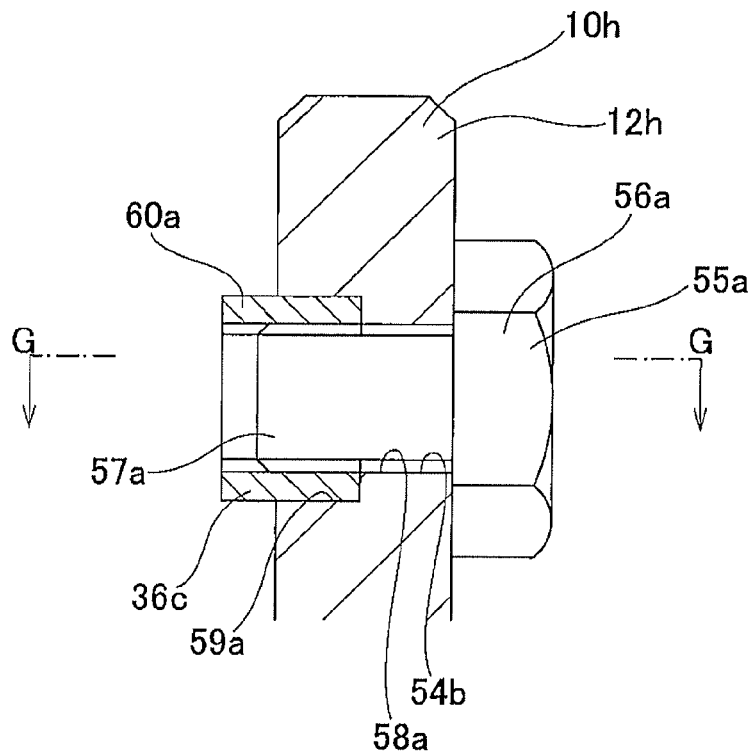
FIG. 15A is a cross-sectional view illustrating a portion of a steering gear unit of a seventh example of an embodiment of the present invention, and illustrates a portion that corresponds to the upper right portion in FIG. 14.
Figure 15B:
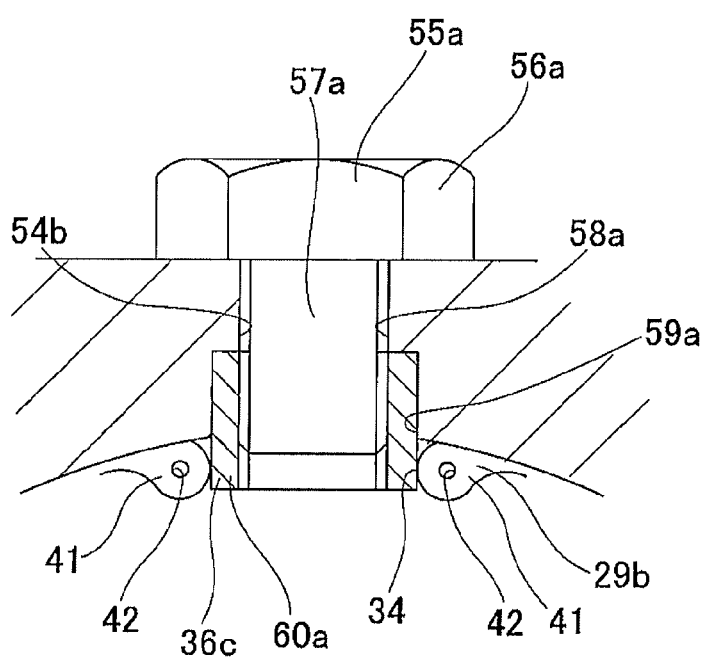
FIG. 15B is a cross-sectional view of section G-G in FIG. 15A.
Figure 16:
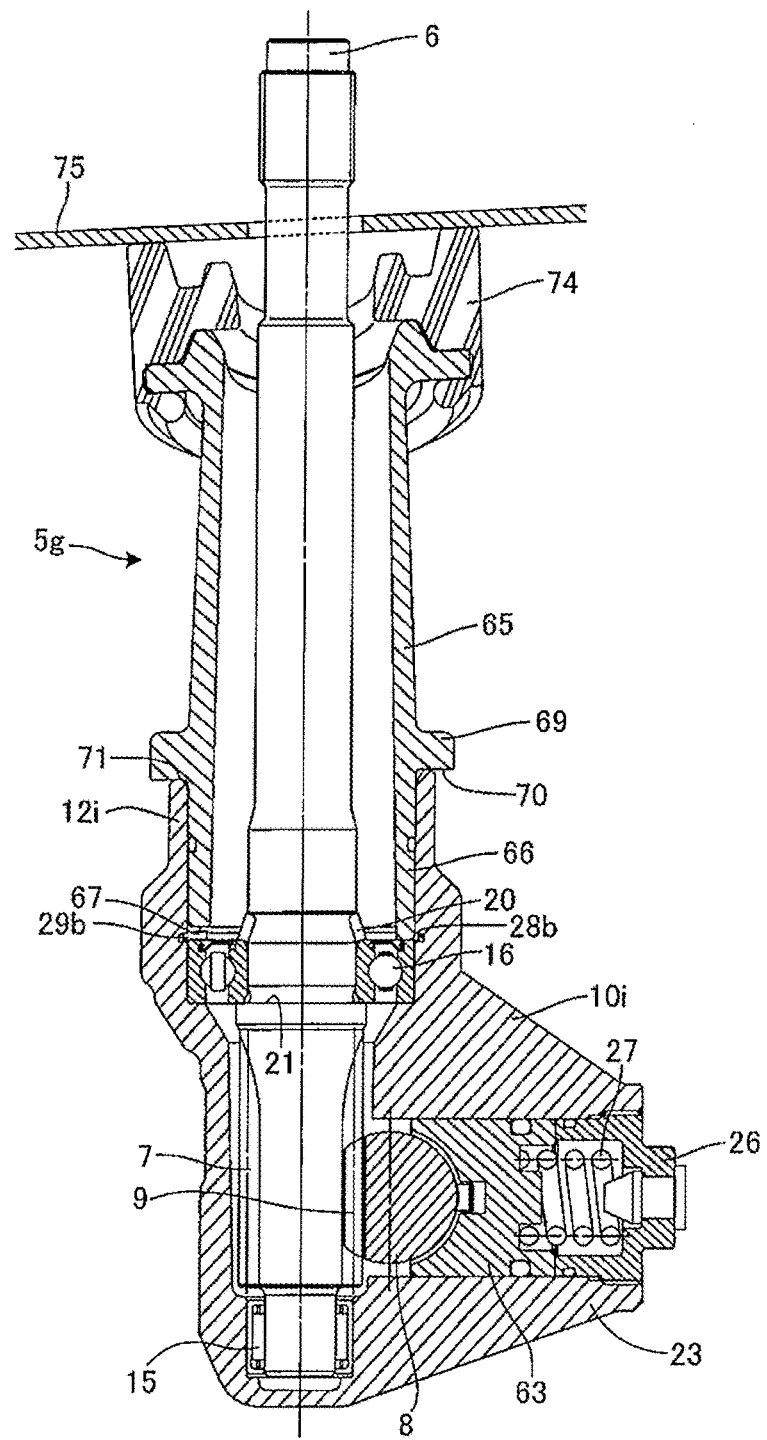
FIG. 16 is a cross-sectional view illustrating an engagement section between a rack and pinion of a steering gear unit of an eighth example of an embodiment of the present invention.

FIG. 15 illustrates a seventh example of an embodiment of the present invention. In this example as well, as in the sixth example of an embodiment, reduction of the diameter of the retaining ring 29b is prevented by using a bolt 55a and nut 60a. In this example, a bolt having a hexagonal shaped head section 56a and a column shaped shaft section 57a with male threads formed around the outer circumferential surface thereof is used as the bolt 55a. A through hole 54b is formed in a portion on the rack shaft 8 (see FIG. 1, FIG. 7 and FIG. 11) side near the opening of the sub housing section 12h of the casing 10h so as to pass through this portion in the radial direction. The through hole 54b has a circular hole section 58a that is formed in the radially outside half section, and a hexagonal shaped non-circular hole section 59a that is formed in the radially inside half section.

With the hexagonal shaped nut 60a placed on the inside of the non-circular hole section 59a so that there is no looseness, the bolt 55a is inserted into the through hole 54b from the radially outside, and the shaft section 57a is screwed into the nut 60a. As a result, the bolt 55a and the nut 60a are fastened to the sub housing section 12h. Moreover, the portion of the nut 60a that protrudes to the radially inside from the non-circular hole section 59a is inserted inside the non-continuous area 34 of the retaining ring 29b as a diameter reduction prevention section 36c.

In this example as well, when, due to a force that is applied to the pinion shaft 6 during steering, a force acts on the retaining ring 29b that would reduce the diameter (inward force in the radial direction), it is definitely possible to prevent reduction of the diameter of the retaining ring 29b. As a result, it is possible to prevent displacement in the axial direction of the retaining ring 29b, and thus it is possible to effectively prevent displacement in the axial direction of the ball bearing 16. The construction and effects of the other parts of this example are the same as in the first example, fifth example and sixth example.

Eighth Example

FIG. 16 to FIG. 22 illustrate an eighth example of an embodiment of the present invention. A feature of the steering gear unit 5g of this example is that together with providing a cover 65 on the opening section of the sub housing section 12i, reduction of the diameter of the retaining ring 29b is prevented by pressure fitting a fitting cylinder section 66 on the tip-end section (bottom-end section in FIG. 16) of the cover 65 into the opening section of the sub housing section 12i and inserting a protrusion 68 that is formed on the tip-end surface 67 of the cover 65 into the non-continuous area 34 of the retaining ring 29b as a diameter reduction prevention section 36d.

Figure 17:
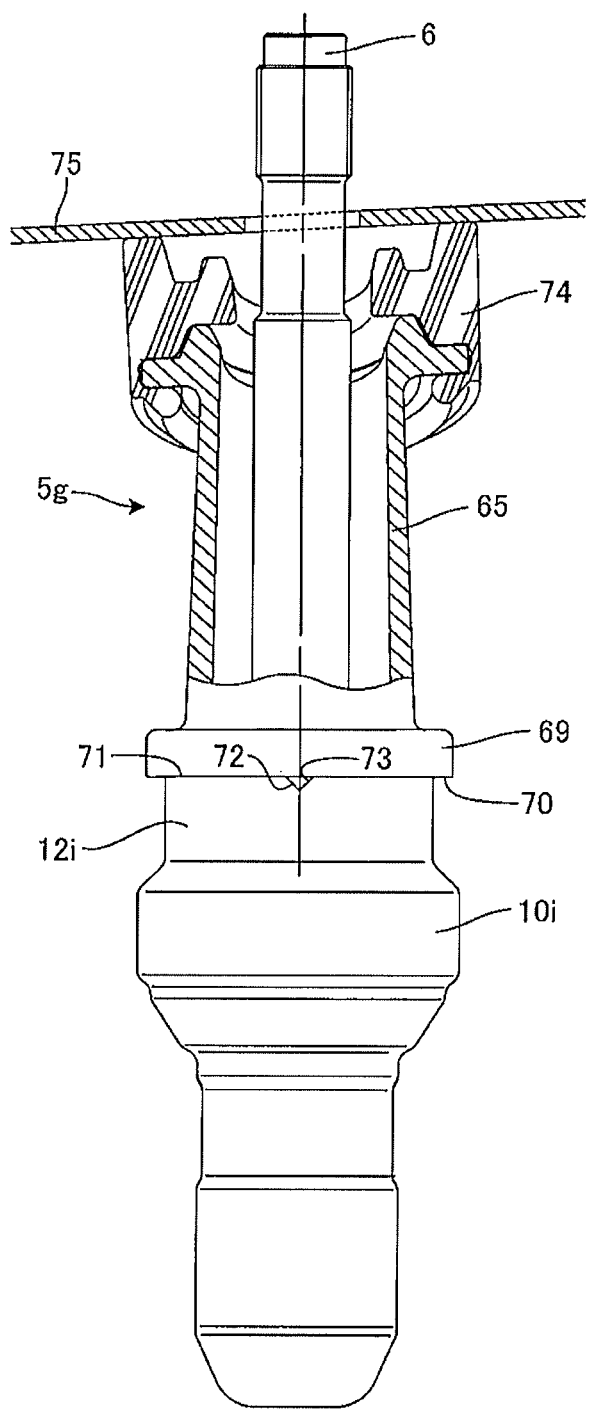
FIG. 17 is a front view of FIG. 16 with part omitted, and with part as cross section as it is.

More specifically, the steering gear unit 5g of this example is attached to the frame of the vehicle body (not illustrated in the figure) such as a front sub frame. A hollow cylindrical shaped cover 65 is fastened to the opening section of the sub housing section 12i by pressure fitting a fitting cylinder section 66 that is provided on the tip-end section (bottom-end section in FIG. 16) of the cover 65 into the opening section of the sub housing section 12i. Moreover, a side surface 70 of a flange section 69 that is provided in the middle section of the cover 65 is brought into contact with a surface 71 on the opening end of the sub housing section 12i, which makes it possible to position the cover 65 in the up-down direction with respect to the sub housing section 12i. As illustrated in FIG. 17, a convex engagement section 72 is formed on the side surface 70 of the flange section 69, and this convex engagement section 72 engages with a concave engagement section 73 that is formed in the opening end surface 71 of the sub housing section 12i. As a result, the cover 65 is prevented from rotating relative to the sub housing section 12i.

The cover 65 covers around the portion of the pinion shaft 6 that protrudes from the opening section of the sub housing section 12i. A rubber gasket 74 is fastened to the end section (base end section, top end section in FIG. 16) on the opposite side of the cover 65 from the portion that fits inside the opening of the sub housing section 12i. This gasket 74 comes in contact with a toe board (vehicle body) 75. Therefore, movement in the upward direction in FIG. 16 of the cover 65 is regulated by the gasket 74. The gasket 74 absorbs displacement of the casing 10i that occurs due to vibration when the vehicle is traveling, and together with lessening impact, prevents dirt and foreign matters from getting into the space between the cover 65 and the pinion shaft 6.

Figure 18:
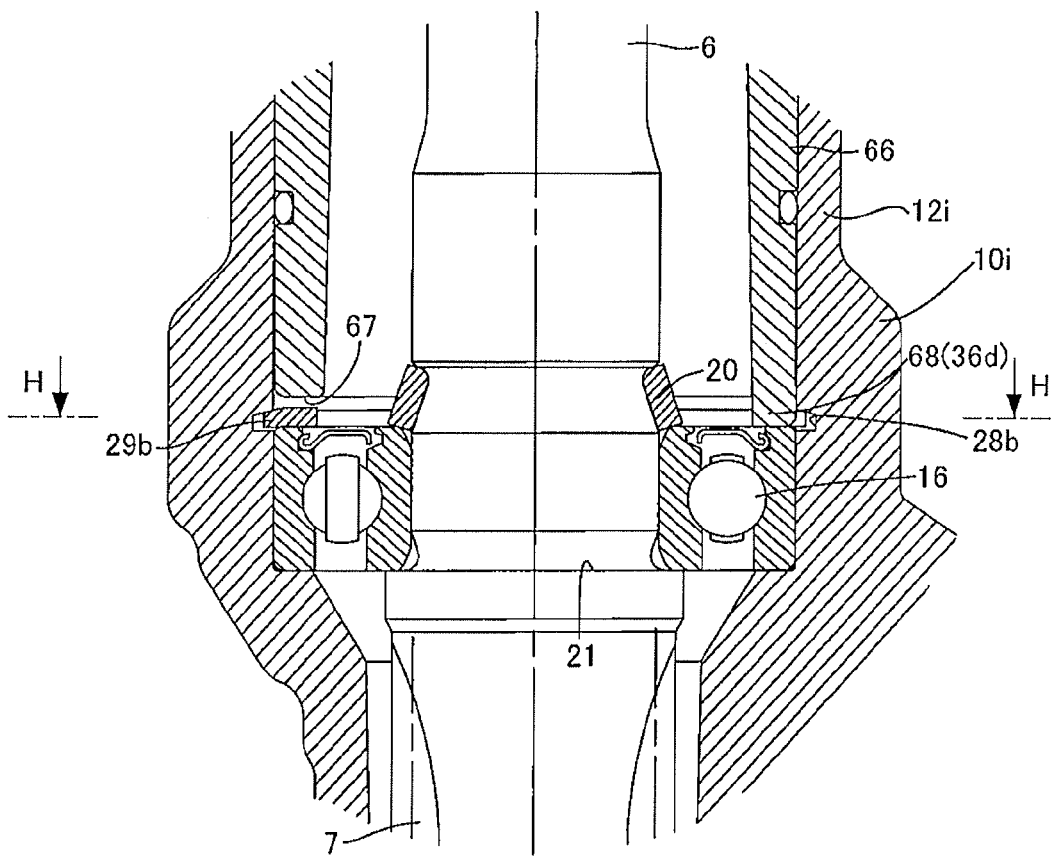
FIG. 18 is an enlarged cross-sectional view of the portion in FIG. 16 near the installation of the ball bearing.
Figure 19:
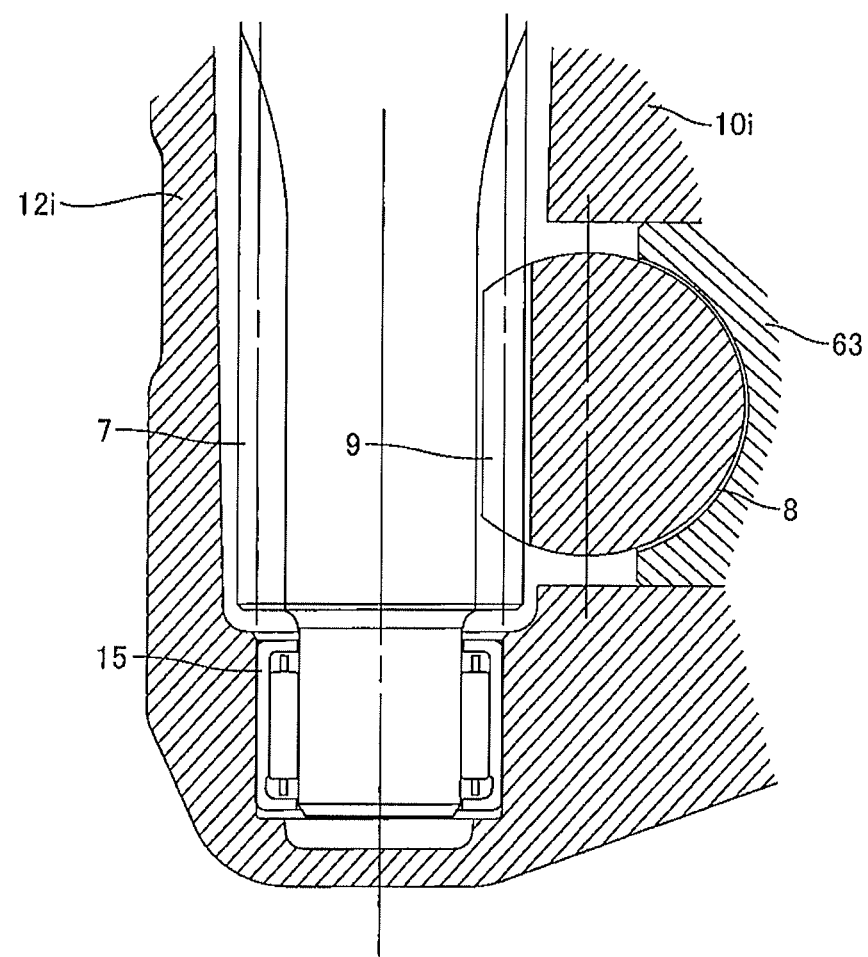
FIG. 19 is an enlarged cross-sectional view of the portion in FIG. 16 near the installation of the radial bearing.
Figure 20:
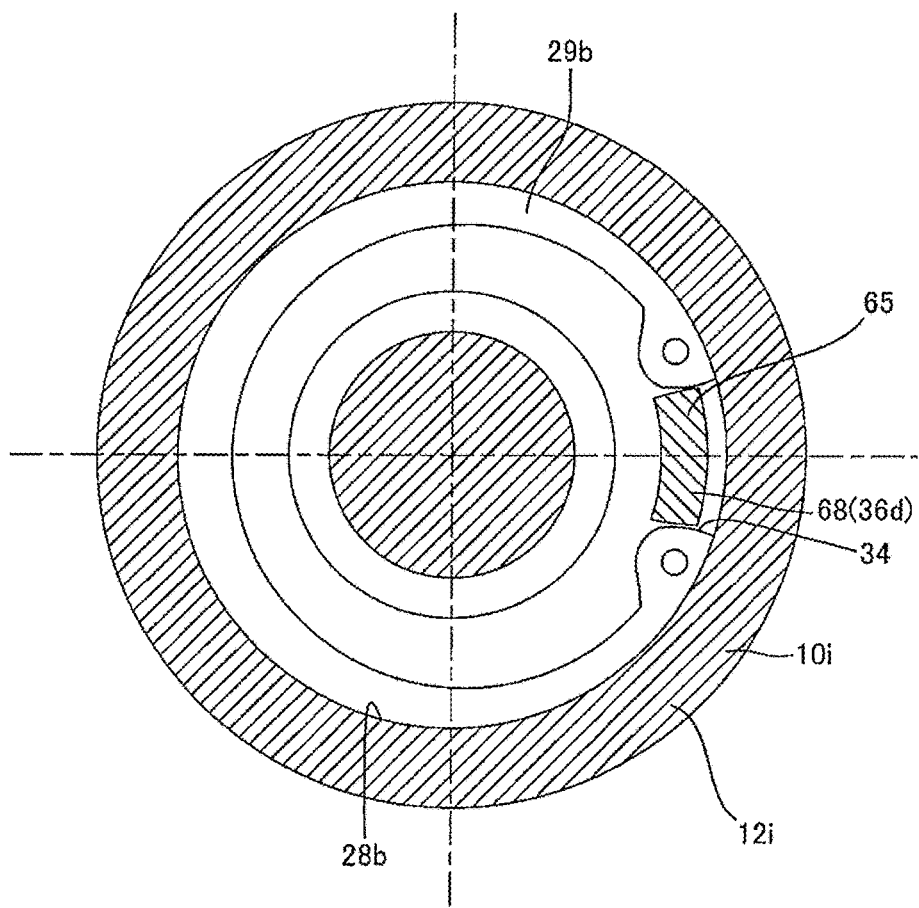
FIG. 20 is a cross-sectional view of section H-H in FIG. 18.
Figure 21A:
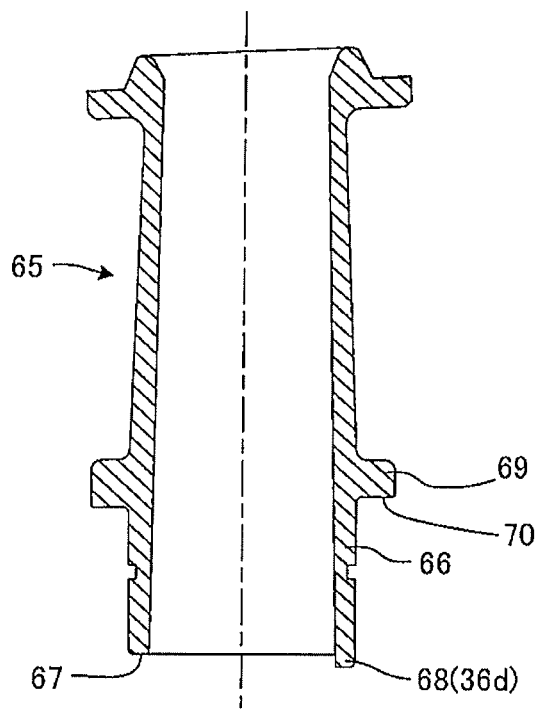
FIG. 21A is a vertical cross-sectional view illustrating a state in which a cover that is used in an eighth example is pulled out.
Figure 21B:
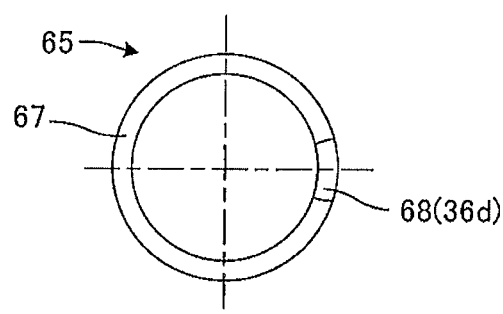
FIG. 21B is a view illustrating the end surface (bottom end surface) thereof.

The cover 65 is formed using a material made by mixing a reinforcement filler such as glass, carbon or the like into a synthetic resin such as nylon, polyacetal (POM) or the like that has excellent oil resistance. As illustrated in FIG. 18, FIG. 20 and FIG. 21, a protrusion 68 that protrudes toward the tip-end side is integrally formed on the tip-end surface 67 (bottom-end surface) of the cover 65, and this protrusion 68 corresponds to the diameter reduction prevention section 36d. This protrusion 68 is formed as a small piece having a small width dimension in the circumferential direction, and the position in the circumferential direction thereof is regulated so as to be in the same phase with the non-continuous area (opening section) 34 of the retaining ring 29b. Therefore, when the fitting cylinder section 66 of the tip-end section of the cover 65 is pressure fitted inside the opening section of the sub housing section 12i, the protrusion 68 is inserted into the non-continuous area 34 of the retaining ring 29b, and the diameter of the retaining ring 29b is prevented from further reduction.

In this example, only a protrusion 68 needs to be integrally formed on the tip-end surface 67 of the cover 65, so processing is simple, and it is possible to suppress any increase in manufacturing cost. Moreover, by the convex engagement section 72 that is provided on the cover 65 engaging with the concave engagement section 73 that is provided in the sub housing section 12i, the phase in the circumferential direction of the cover 65 and the sub housing section 12i becomes fixed, and thus it becomes easy to match the phase in the circumferential direction of the protrusion 68 that is provided on the cover 65 to the phase of the non-continuous area 34 of the retaining ring 29b. Furthermore, the base-end section of the cover 65 comes in contact with the toe board (vehicle body) 75 by way of the gasket 74, and this regulates movement of the cover 65 toward the base-end side, so the cover 65 is prevented from coming out from the sub housing section 12i. The construction and effects of the other parts are the same as in the first example.

Ninth Example

Figure 22:
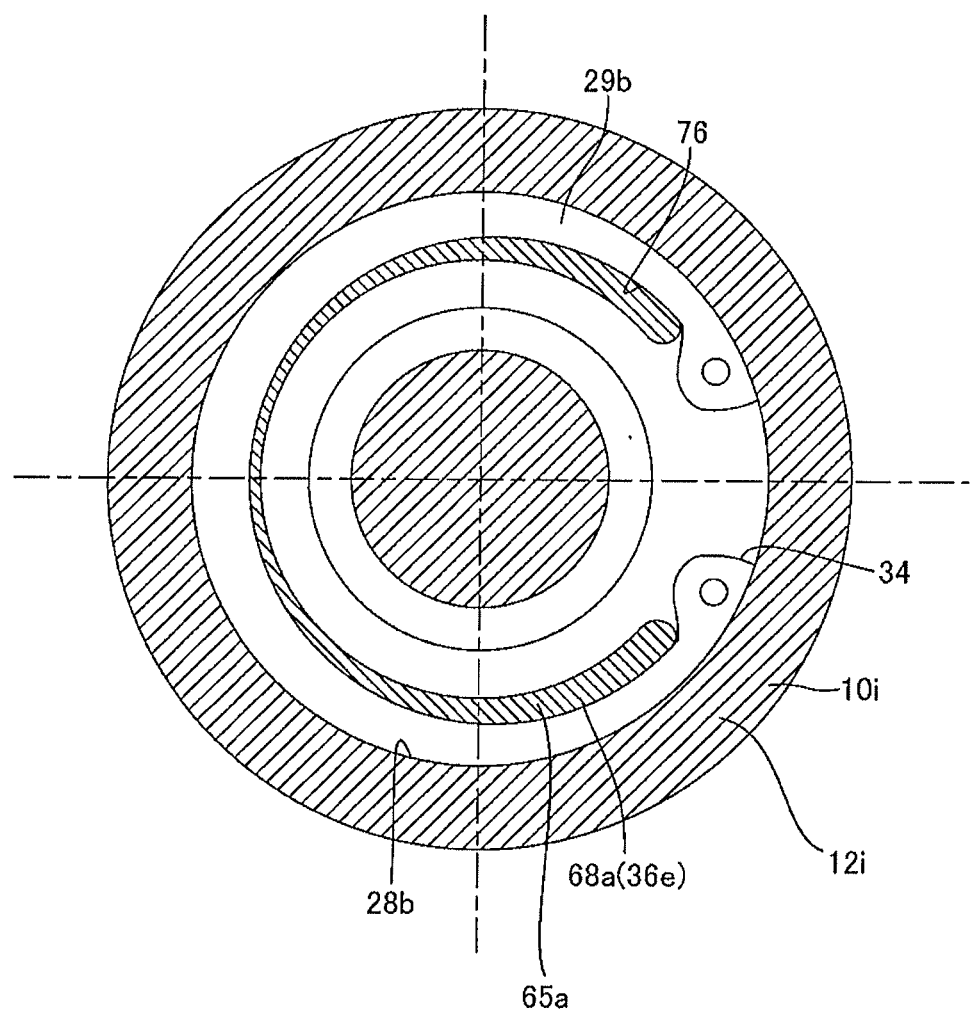
FIG. 22 is a cross-sectional drawing of steering gear unit of a ninth example of an embodiment of the present invention and corresponds to FIG. 20.
Figure 23A:
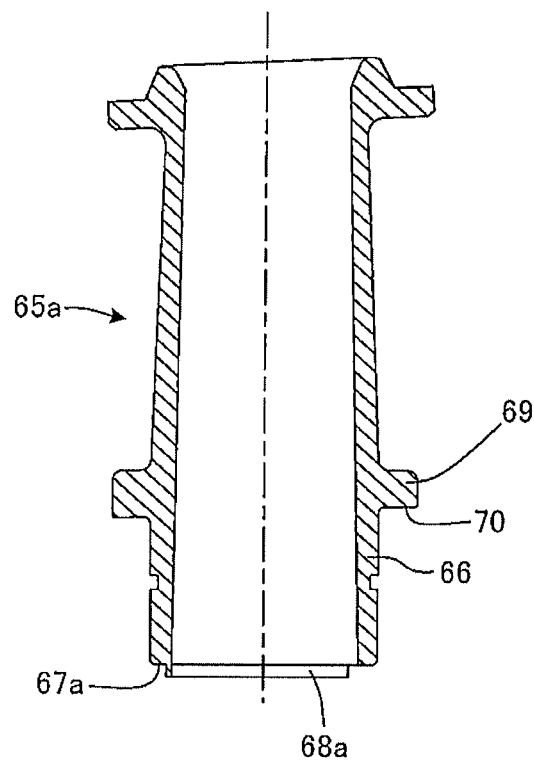
FIG. 23A is a vertical cross-sectional view illustrating a state in which a cover that is used in an ninth example is pulled out.
Figure 23B:
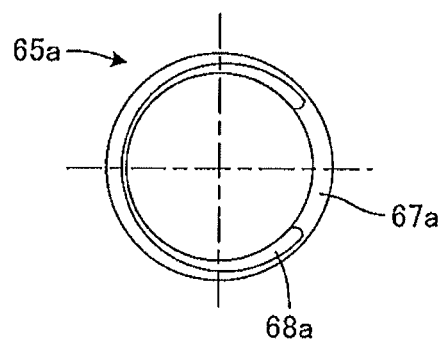
FIG. 23B is a view illustrating the end surface (bottom end surface) thereof.

FIG. 22 and FIG. 23 illustrate a ninth example of an embodiment of the present invention. This example is a variation of the eighth example of an embodiment. In this example, a C-shaped protrusion 68a that protrudes toward the tip-end side is formed on the tip-end surface 67a of the cover 65a, and this protrusion 68a corresponds to the diameter reduction prevention section 36e. When the fitting cylinder section 66 on the tip-end section of the cover 65a is pressure fitted inside the opening section of the sub housing section 12i, the protrusion 68a fits inside the inner circumferential surface 76 of the retaining ring 29b, and the diameter of the retaining ring 29b is prevented from further reduction. The construction and effects of the other parts of this example are the same as in the eighth example.

Tenth Example

Figure 24:
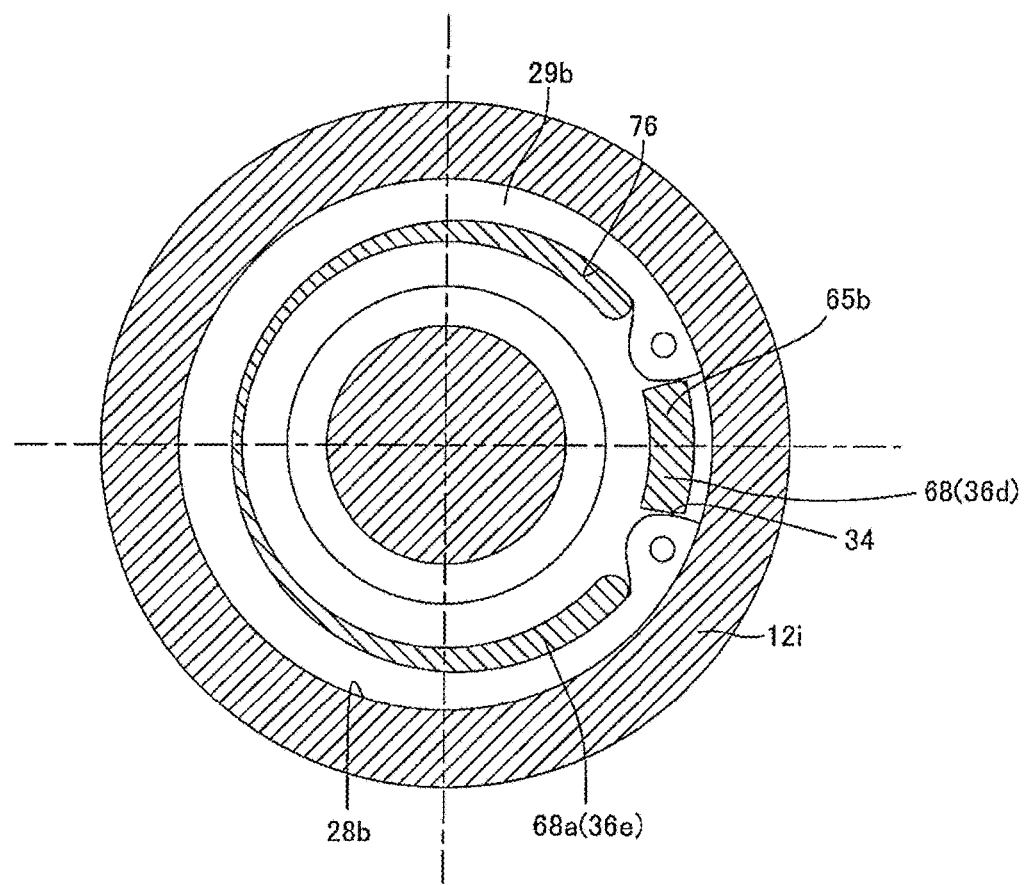
FIG. 24 is a cross-sectional view of steering gear unit of a tenth example of an embodiment of the present invention and corresponds to FIG. 20.
Figure 25A:
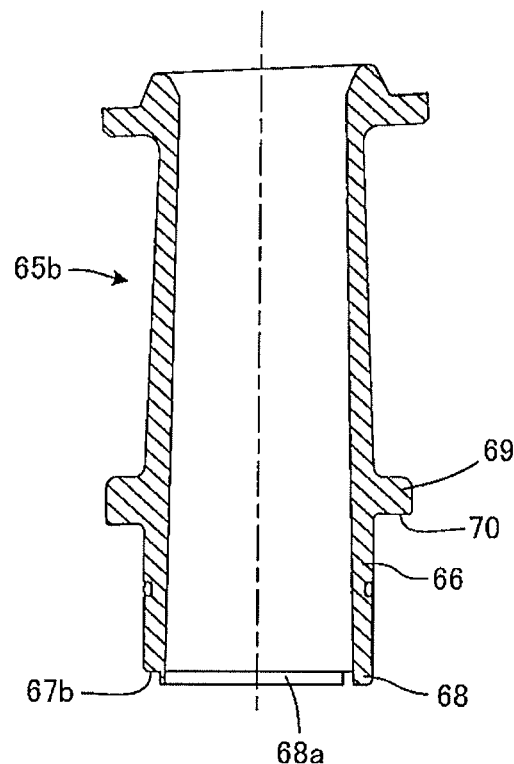
FIG. 25A is a vertical cross-sectional view illustrating a state in which a cover that is used in an tenth example is pulled out.
Figure 25B:
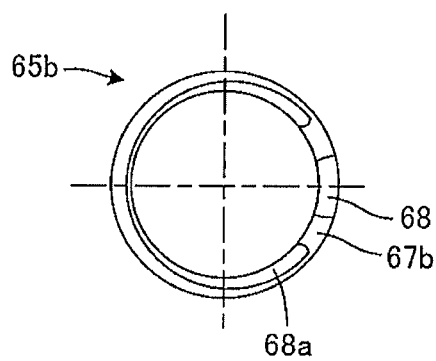
FIG. 25B is a view illustrating the end surface (bottom end surface) thereof.

FIG. 24 and FIG. 25 illustrate a tenth example of an embodiment of the present invention. This embodiment is a variation of the eighth and ninth examples of an embodiment. In this example, both a small piece protrusion 68 and a C-shaped protrusion 68a that protrude toward the tip-end side are integrally formed on the tip-end surface 67b of the cover 65b. In other words, in this example, the tip-end surface 67b of the cover 65 has both a diameter reduction prevention section 36d for inserting into the non-continuous area 34 of the retaining ring 29b, and a diameter reduction prevention section 36e for fitting inside the inner-circumferential surface 76 of the retaining ring 29b. When the fitting cylinder section 66 on the tip-end section of the cover 65b is pressure fitted inside the opening section of the sub housing section 12i, the protrusion 68 (diameter reduction prevention section 36d) is inserted into the non-continuous area 34 of the retaining ring 29b, and the protrusion 68a (diameter reduction prevention section 36e) is fitted inside the inner-circumferential surface 76 of the retaining ring 29b, which prevents the diameter of the retaining ring 29b from further reduction. The construction and effects of the other parts of this example are the same as in the eighth and ninth examples.

Figure 26A:
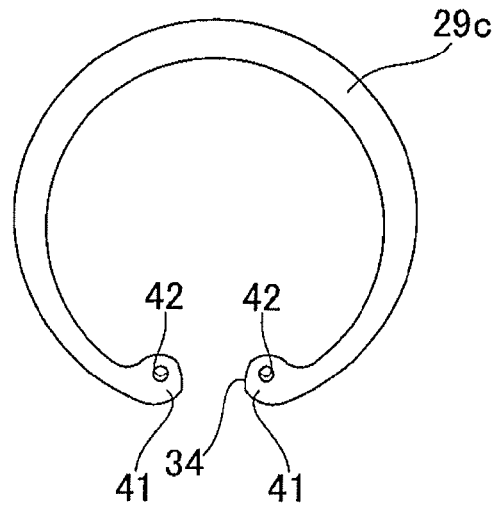
FIGS. 26A to 26C are front views illustrating three examples of the construction of retaining rings that can be used in the present invention.
Figure 26B:
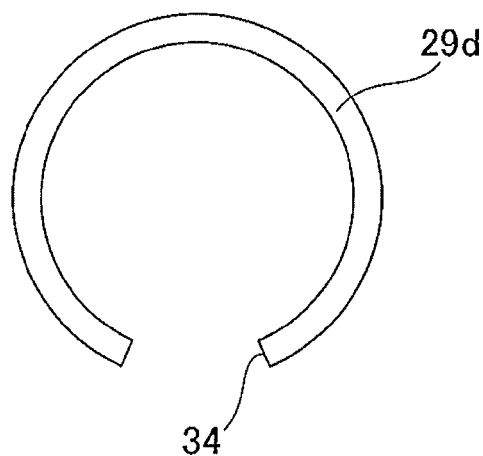
Figure 26C:
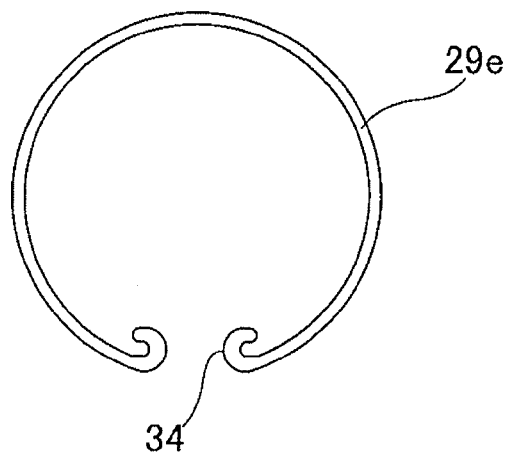

When implementing the present invention, the construction (shape) of the retaining ring is not limited to constructions illustrated in the examples of an embodiment, and it is also possible to use retaining rings that are illustrated in FIG. 26A to FIG. 26C. FIG. 26A illustrates an example of an eccentric retaining ring for a C-shaped hole that is defined in JIS B 2804. As in the case of the construction of FIG. 26A, it is possible to employ construction in which the width dimension in the radial direction of the retaining ring 29c is not constant in the circumferential direction. Specifically, it is possible to employ construction in which the width dimension at the opposite side in the radial direction of the non-continuous area 34 is large. As FIG. 26B illustrates an example of a concentric retaining ring for the C-shaped hole that is defined in JIS B 2804. In the case of the construction of FIG. 26B, it is also possible to employ construction in which the width dimension in the radial direction of the retaining ring 29d is constant in the circumferential direction, and no fastening arms are provided in the opposing portions of the non-continuous area 34 of the retaining ring 29b. Furthermore, as in the case of the construction in FIG. 26C, it is also possible to use a retaining ring 29e that is formed by bending a wire to become approximately C shaped. Although it is not illustrated in a figure, it is also possible to use a retaining ring that does not have a tapered surface on one surface.

Figure 27:
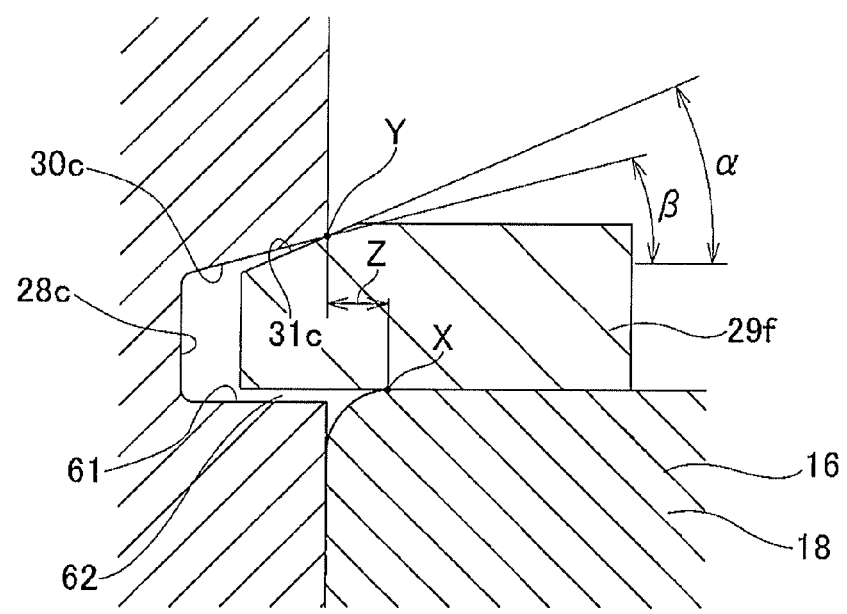
FIG. 27 is a cross-sectional view illustrating an example of the engagement between a retaining ring and fastening groove that can be used in the present invention.

When implementing the present invention, it is possible to employ engaging construction for the fastening groove 28c and retaining ring 29f as illustrated in FIG. 27. That is, the inclination α of a tapered surface 31c of the retaining ring 29f is greater than the inclination β of a side surface 30c of the fastening groove 28c, and the opening edge section of this side surface 30c comes in contact with this tapered surface 31c. Moreover, within the fastening groove 28c, a space 62 is provided between a side surface 30c, side surface 61 that is opposite from the side surface 30c, and the retaining ring 29f. By employing construction like this, it is possible to reduce the moment that acts on the retaining ring 29f that due to a thrust force that acts from the outer ring 18 of the ball bearing 16. In other words, it is possible to shorten the distance (Z) from the power point (X) where the force is applied to the fulcrum point (Y), so it is possible to reduce the moment that acts on the retaining ring 29f. As a result, it is possible to effectively prevent the retaining ring 29 from falling out.

In each of the examples of an embodiment, examples were explained in which the present invention was applied to a column-assist rack and pinion power-steering apparatus. However, the present invention can also be applied to pinion-assist rack and pinion power-steering apparatus, a manual rack and pinion steering apparatus and the like.

| [Explanation of Reference Numbers] | |
|---|---|
| 1 | Steering wheel |
| 2 | Steering shaft |
| 3 | Universal joint |
| 4 | Intermediate shaft |
| 5, 5a to 5g | Steering gear unit |
| 6 | Pinion shaft |
| 7 | Pinion teeth |
| 8 | Rack shaft |
| 9 | Rack teeth |
| 10, 10a to 10i | Casing |
| 11 | Main housing section |
| 12, 12a to 12i | Sub housing section |
| 13 | Spherical joint |
| 14 | Tie rod |
| 15 | Radial needle bearing |
| 16 | Ball bearing |
| 17 | Inner ring |
| 18 | Outer ring |
| 19 | Radially inside stepped surface |
| 20 | Retaining ring |
| 21 | Radially outside stepped surface |
| 22, 22a | Pressure screw cylinder |
| 23 | Cylinder section |
| 24 | Pressure roller |
| 25 | Sliding block |
| 26 | Cover |
| 27 | Spring |
| 28, 28a, 28b, 28c | Fastening groove |
| 29, 29a, 29b, 29c, 29d, 29e, 29f | Retaining ring |
| 30, 30a, 30b, 30c | Side surface |
| 31, 31a, 31b, 31c | Tapered surface |
| 32 | Protrusion |
| 33 | Annular shaped concave groove |
| 34 | Non-continuous area (opening section) |
| 35, 35a, 35b, 35c | Clip |
| 36, 36a to 36e | Diameter reduction prevention section |
| 37 | Ball |
| 38 | Retainer |
| 39 | Inner raceway |
| 40 | Outer raceway |
| 41 | Fastening arm section |
| 42 | Fastening hole |
| 43, 43a, 43b | Radially outside arm section |
| 44, 44a | Radially inside arm section |
| 45 | Base section |
| 46, 46a | Radially outside flat surface section |
| 47 | Radially inside flat surface section |
| 48, 48a, 48b, 48c | Stopper structure |
| 49 | Inclined surface |
| 50 | Fastening concave groove |
| 51 | Radially outside engagement protrusion section |
| 52 | Radially inside engagement protrusion section |
| 53 | Key member |
| 54, 54a, 54b | Through hole |
| 55, 55a | Bolt |
| 56, 56a | Head section |
| 57 | Shaft section |
| 58, 58a | Circular hole section |
| 59, 59a | Non-circular hole section |
| 60, 60a | Nut |
| 61 | Side surface |
| 62 | Space |
| 63 | Pressure block |
| 64 | Inclined section |
| 65, 65a, 65b | Cover |
| 66 | Fitting cylinder section |
| 67, 67a, 67b | Tip-end surface |
| 68, 68a | Protrusion |
| 69 | Flange section |
| 70 | Side surface |
| 71 | Opening end surface |
| 72 | Convex engagement section |
| 73 | Concave engagement section |

| | [Explanation of Reference Numbers] |
|---|---|
| 74 | Gasket |
| 75 | Toe board |
| 76 | Inner circumferential surface |

What is claimed is:

1. A rack and pinion steering gear unit comprising:

a casing having a cylindrical shaped main housing section that is open on both ends, and a cylindrical shaped sub housing section that is open on one end and is provided in a skewed position with respect to the main housing section;

a rack shaft having rack teeth on a front surface thereof, and is located on an inside of the main housing section of the casing so as to be able to displace in an axial direction thereof;

a pinion shaft having pinion teeth that are formed on a tip half section in an axial direction thereof and that engage with the rack teeth, and with a base end section in an axial direction thereof protruding to an outside through an opening section of the sub housing section of the casing, is supported inside the sub housing section so at to be able to rotate freely;

a rolling bearing comprising an inner ring having an inner raceway around an outer circumferential surface thereof, an outer ring having an outer raceway around an inner circumferential surface thereof, and a plurality of rolling bodies that are provided between the inner raceway and outer raceway so as to be able to roll freely; and in order to support the pinion shaft inside the sub housing section, the inner ring is fastened around a portion of the pinion shaft that is closer to the base end section side in the axial direction than a portion where the pinion teeth are formed, and with one side surface in the axial direction of the outer ring being in contact with a stepped surface that is formed around the inner circumferential surface of the sub housing section, the outer ring is fitted inside and supported to the sub housing section;

a C-shaped incomplete circular ring shaped retaining ring that is located around a middle section in the axial direction of the pinion shaft, that is provided with a non-continuous area, and that, with a radially outside portion thereof fastened to a fastening groove that is formed around the inner circumferential surface of the sub housing section, presses one side surface in the axial direction of a radially inside portion thereof against other side surface in the axial direction of the outer ring so as to apply a preload to the ball bearing;

a cover fitted into the opening section of the sub housing section and covering around the pinion shaft; and a diameter reduction prevention section formed on a tip-end surface of the cover so as to protrude toward a tip-end side of the cover and engaging with the retaining ring so as to prevent reduction of the diameter of the retaining ring, wherein the diameter reduction prevention section is fitted inside an inner-circumferential surface of retaining ring.

2. A rack and pinion steering gear unit comprising:

a casing having a cylindrical shaped main housing section that is open on both ends, and a cylindrical shaped sub housing section that is open on one end and is provided in a skewed position with respect to the main housing section;

a rack shaft having rack teeth on a front surface thereof, and is located on an inside of the main housing section of the casing so as to be able to displace in an axial direction thereof;

a pinion shaft having pinion teeth that are formed on a tip half section in an axial direction thereof and that engage with the rack teeth, and with a base end section in an axial direction thereof protruding to an outside through an opening section of the sub housing section of the casing, is supported inside the sub housing section so at to be able to rotate freely;

a rolling bearing comprising an inner ring having an inner raceway around an outer circumferential surface thereof, an outer ring having an outer raceway around an inner circumferential surface thereof, and a plurality of rolling bodies that are provided between the inner raceway and outer raceway so as to be able to roll freely; and in order to support the pinion shaft inside the sub housing section, the inner ring is fastened around a portion of the pinion shaft that is closer to the base end section side in the axial direction than a portion where the pinion teeth are formed, and with one side surface in the axial direction of the outer ring being in contact with a stepped surface that is formed around the inner circumferential surface of the sub housing section, the outer ring is fitted inside and supported to the sub housing section;

a C-shaped incomplete circular ring shaped retaining ring that is located around a middle section in the axial direction of the pinion shaft, that is provided with a non-continuous area, and that, with a radially outside portion thereof fastened to a fastening groove that is formed around the inner circumferential surface of the sub housing section, presses one side surface in the axial direction of a radially inside portion thereof against other side surface in the axial direction of the outer ring so as to apply a preload to the ball bearing;

a cover fitted into the opening section of the sub housing section and covering around the pinion shaft; and a diameter reduction prevention section formed on a tip-end surface of the cover so as to protrude toward a tip-end side of the cover and engaging with the retaining ring so as to prevent reduction of the diameter of the retaining ring, wherein a concave and convex engagement section for regulating relative rotation of the cover with respect to the sub housing section is provided between the cover and the sub housing section.

3. The rack and pinion steering gear unit comprising:

a casing having a cylindrical shaped main housing section that is open on both ends, and a cylindrical shaped sub housing section that is open on one end and is provided in a skewed position with respect to the main housing section;

a rack shaft having rack teeth on a front surface thereof, and is located on an inside of the main housing section of the casing so as to be able to displace in an axial direction thereof;

a pinion shaft having pinion teeth that are formed on a tip half section in an axial direction thereof and that engage with the rack teeth, and with a base end section in an axial direction thereof protruding to an outside through an opening section of the sub housing section of the casing, is supported inside the sub housing section so at to be able to rotate freely;

a rolling bearing comprising an inner ring having an inner raceway around an outer circumferential surface thereof, an outer ring having an outer raceway around an inner circumferential surface thereof, and a plurality of rolling bodies that are provided between the inner raceway and outer raceway so as to be able to roll freely; and in order to support the pinion shaft inside the sub housing section, the inner ring is fastened around a portion of the pinion shaft that is closer to the base end section side in the axial direction than a portion where the pinion teeth are formed, and with one side surface in the axial direction of the outer ring being in contact with a stepped surface that is formed around the inner circumferential surface of the sub housing section, the outer ring is fitted inside and supported to the sub housing section;

a C-shaped incomplete circular ring shaped retaining ring that is located around a middle section in the axial direction of the pinion shaft, that is provided with a non-continuous area, and that, with a radially outside portion thereof fastened to a fastening groove that is formed around the inner circumferential surface of the sub housing section, presses one side surface in the axial direction of a radially inside portion thereof against other side surface in the axial direction of the outer ring so as to apply a preload to the ball bearing;

a cover fitted into the opening section of the sub housing section and covering around the pinion shaft; and a diameter reduction prevention section formed on a tip-end surface of the cover so as to protrude toward a tip-end side of the cover and engaging with the retaining ring so as to prevent reduction of the diameter of the retaining ring, wherein another end section of the cover on the opposite side from the side where the diameter reduction prevention section is provided comes in contact with part of a vehicle body by way a gasket made of an elastic material.

* * * * *